United States Patent [19]
Yoshida et al.

[11] Patent Number: 5,867,476
[45] Date of Patent: Feb. 2, 1999

[54] CARTRIDGE ADAPTOR AND A CARTRIDGE TO BE ACCOMMODATED IN THE CARTRIDGE ADAPTOR

[75] Inventors: Norikatsu Yoshida, Kadoma; Yoshikazu Goto, Hirakata; Soichiro Mima, Nishinomiya; Benichi Miyazaki, Katano; Kimiaki Sano, Kawanishi, all of Japan

[73] Assignee: Matsushita Electric Industrial Co., Ltd., Osaka, Japan

[21] Appl. No.: 918,465

[22] Filed: Aug. 26, 1997

Related U.S. Application Data

[62] Division of Ser. No. 668,001, Jun. 19, 1996, Pat. No. 5,715,233, which is a continuation of Ser. No. 217,203, Mar. 23, 1994, abandoned.

[30] Foreign Application Priority Data

Mar. 23, 1993 [JP] Japan ......................................... 5-63691

[51] Int. Cl.$^6$ .................................................... G11B 23/03
[52] U.S. Cl. ............................ 369/289; 369/291; 360/133
[58] Field of Search ................................. 369/289, 290, 369/291, 292; 360/133, 137

[56] References Cited

U.S. PATENT DOCUMENTS

| | | | |
|---|---|---|---|
| 5,150,354 | 9/1992 | Iwata et al. | 369/291 |
| 5,204,853 | 4/1993 | Kamoshita | 369/289 |
| 5,208,802 | 5/1993 | Suzuki et al. | 369/289 |
| 5,331,627 | 7/1994 | Childers et al. | 369/289 |

FOREIGN PATENT DOCUMENTS

| | | | |
|---|---|---|---|
| 288900 | 11/1988 | European Pat. Off. | |
| 331389 | 9/1989 | European Pat. Off. | |
| 61-13474 | 1/1986 | Japan | 369/289 |
| 2-121174 | 5/1990 | Japan | |
| 2-187973 | 7/1990 | Japan | |
| 2-263353 | 10/1990 | Japan | |
| 3-89570 | 9/1991 | Japan | |
| 06-243628 | 9/1994 | Japan | |

*Primary Examiner*—David L. Ometz
*Attorney, Agent, or Firm*—Ratner & Prestia

[57] ABSTRACT

A cartridge adaptor accommodates a second cartridge which is smaller than a first cartridge so as to allow the second cartridge to be mounted in a disk apparatus designed to receive the first cartridge. The cartridge adaptor includes a shutter opener engageable with a shutter opener of the disk apparatus to open and close a shutter of the second cartridge, a projection engageable with a recess of the second cartridge to restrict insertion direction of the second cartridge into the disk apparatus, and a conveying member which is inserted into a transmission aperture formed in correspondence with an identification hole formed in the second cartridge, thereby opening and closing a detection hole of the cartridge adaptor formed at a corresponding position to an identification hole of the first cartridge. When the cartridge adaptor accommodating the second cartridge is mounted in the disk apparatus, the shutter of the second cartridge is opened, and the information on a disk housed in the second cartridge provided by the identification hole is correctly detected by the disk apparatus.

2 Claims, 16 Drawing Sheets

CARTRIDGE ADAPTOR AND A CARTRIDGE TO BE ACCOMMODATED IN THE CARTRIDGE ADAPTOR

This application is a division of application Ser. No. 08/668,001, filed Jun. 19, 1993, U.S. Pat. No. 5,715,233, which is a continuation of Ser. No. 08/217,203, filed Mar. 29, 1994, now abandoned.

BACKGROUND OF THE INVENTION

1. Field of the Invention

The present invention relates to a cartridge adaptor mountable in a disk apparatus for reproducing or recording and reproducing a disk accommodated in a cartridge, and also to a cartridge to be accommodated in the cartridge adaptor.

2. Description of the Related Art

Along with recent improvement in the recording density of disk-shaped recording mediums such as optical disks, the resistance of such recording mediums against dust and scratches has been lowered. For the purpose of protection of the surfaces, such recording mediums are accommodated in a cartridge formed of a plastic material or the like.

A cartridge includes a case having an opening for accommodating a disk, a shutter for opening and closing the opening, and the like. Through the opening, a disk driving mechanism and a recording and reproducing head is inserted into the cartridge.

Today, optical disks are available in sizes of 3.5 inches and 5.25 inches in the field of data processing. In the audio and video field, the optical disks are available from a minimum size of 2.5 inches to a maximum size of 12 inches. Different cartridges for reproducing or recording and reproducing apparatuses are designed to receive different sizes of optical disks.

Demand for recording data in and reproducing data from different sizes of disks using one disk apparatus has been increased. Different sizes of disks, which are accommodated in different sizes of cartridges, can hardly be mounted directly in one disk apparatus. In order to mount a cartridge which is smaller than a cartridge which the disk apparatus is designed to receive, the smaller cartridge is first accommodated in a cartridge adaptor and then the cartridge adaptor is mounted in the disk apparatus. Examples of such a cartridge adaptor are disclosed in Japanese Laid-Open Patent Publication Nos. 2-121174 and 2-187973.

A conventional cartridge to be accommodated in a cartridge adaptor mainly includes a cartridge case having a head opening, a shutter for opening and closing the head opening, and an optical disk rotatably accommodated in the cartridge case. A surface of the cartridge case has a write protect tab for prohibiting erroneous deletion of data. The shutter is constantly elastically biased to close the head opening by a spring member built in the cartridge case.

A conventional cartridge adaptor mainly includes a case having a cartridge receptacle portion and a head opening and a shutter for opening and closing the head opening. In the case, an arm for opening and closing the shutter of the cartridge is pivotably supported. The arm is elastically biased by a tension spring. The case has a detection hole for, when the cartridge is accommodated in the cartridge adaptor, detecting the state of the write protect tab from outside the cartridge adaptor.

When the cartridge is inserted into the cartridge adaptor, a tip of the arm engages the shutter of the cartridge, thereby opening the shutter of the cartridge. When the cartridge adaptor is inserted into the disk apparatus, the shutter of the cartridge adaptor is opened, and the optical disk accommodated in the cartridge can be recorded or reproduced.

The cartridge and the cartridge adaptor having the above-described conventional structure has the following inconveniences.

(1) It is necessary to provide in the cartridge adaptor an arm for opening and closing the shutter of the cartridge and a shutter formed of, for example, a spring and a slider. The provision of such members are difficult due to the limited space in the cartridge adaptor and also makes the structure of the cartridge adaptor complicated. The provision of these members also limits the height of the cartridge receptacle portion since space in which the shutter is movably provided is necessary. Accordingly, the cartridge adaptor may not be able to accommodate a thick cartridge.

(2) In the case when the cartridge is inserted into the cartridge adaptor upside down, the tip of the arm does not engage the shutter of the cartridge. Then, the cartridge may undesirably be mounted in the cartridge adaptor with the shutter of the cartridge being closed. If the cartridge adaptor in such a state is inserted into the disk apparatus, the optical disk cannot be recorded or reproduced since the shutter of the cartridge is closed, and further an optical head of the disk apparatus may undesirably collide against the shutter of the cartridge and be broken.

(3) Generally, cartridges and cartridge adaptors for two-sided optical disks have an identifier for discriminating an A side from a B side of the optical disk. The identifier is detected by the disk apparatus to identify whether the current side is the A side or the B side, and thus data can be written in or read from the optical disk correctly. The above-described conventional cartridge adaptor can accommodate a cartridge even if the cartridge is inserted upside down. Accordingly, the cartridge may undesirably be mounted in the cartridge adaptor with the B side of the cartridge being on the A side of the cartridge adaptor. When this occurs, the disk apparatus detects the identifier for the A side of the cartridge adaptor and thus recognizes the current side as A, although the correct current side is B. Such an inconvenience may cause malfunction of the disk apparatus.

(4) The write protect tab for prohibiting erroneous deletion of data and the above-mentioned identifier are disposed at ends of the cartridge so that the tab and the identifier may not interfere with the optical disk accommodated in the cartridge. Accordingly, different sizes of cartridges have the tabs and the identifiers at different positions in the state of being mounted in the disk apparatus. The above-described conventional cartridge adaptor has a hole for detecting the state of the write protect tab from outside the cartridge adaptor. However, a cartridge accommodated in the cartridge adaptor has a write protect tab at a different position from the position of the write protect tab of a cartridge which the disk apparatus is designed to receive. Such an inconvenience requires provision of a mechanism in the disk apparatus for detecting the state of the write protect tab, which makes the structure of the disk apparatus complicated.

SUMMARY OF THE INVENTION

A cartridge adaptor, according to the present invention, for allowing a disk apparatus designed to receive a first cartridge accommodating a first disk and provided with a shutter opening and closing mechanism for opening and closing a shutter of the first cartridge, to perform at least one of data reproduction and data recording from and in a second disk accommodated in a second cartridge, the second cartridge being smaller in external profile than the first cartridge and provided with a shutter for providing an opening of the second cartridge for insertion therethrough of at least a head for at least one of reproducing and recording and a disk driving mechanism of the disk apparatus, the cartridge adaptor includes a housing for accommodating the second cartridge, the housing having an opening for insertion therethrough of at least the head and the disk driving mechanism; a shutter opener movable in the housing and having a first engaging section engageable with the shutter opening and closing mechanism of the disk apparatus and a second engaging section engageable with the shutter of the second cartridge; and a biasing mechanism for biasing the shutter opener in the direction of closing the shutter of the second cartridge. The housing has an external profile substantially identical with the profile of the first cartridge so as to be received by the disk apparatus. When the second cartridge is mounted in the cartridge adaptor, the position and height of the second disk relative to the cartridge adaptor substantially correspond to the position and height of the first disk relative to the first cartridge.

In one embodiment of the invention, when the cartridge adaptor is inserted into the disk apparatus, the first engaging section engages the shutter opening and closing mechanism of the disk apparatus and causes the shutter opener to move through a first distance, after which the second engaging section engages the shutter of the second cartridge and moves through a second distance to move the shutter of the second cartridge. The second distance is less than the distance of movement of the shutter of the first cartridge when the first cartridge is inserted into the disk apparatus.

In one embodiment of the invention, the shutter opener includes a first opener which includes the first engaging section and is movable by the distance of movement of the shutter of the first cartridge; and a second opener which has the second engaging section and a contact section contactable with the first opener and movable by the distance of movement of the shutter of the second cartridge when the second cartridge is inserted into the disk apparatus. When the cartridge adaptor is inserted into the disk apparatus, the first opener moves by the difference between the distance of movement of the shutter of the first cartridge and the distance of movement of the shutter of the second cartridge and then the contact section of the second opener contacts the first opener.

In another aspect to the invention, in a combination of a cartridge adaptor mountable in a disk apparatus designed to perform at least one of data reproduction and data recording from and in a disk accommodated in a first cartridge, and a second cartridge to be accommodated in the cartridge adaptor, the second cartridge is smaller in external profile than the first cartridge and includes an opening for insertion therethrough of at least a head for at least one of reproducing and recording and a disk driving mechanism of the disk apparatus, two surfaces respectively corresponding to an A side and a B side, and an identification device for indicating which of the two surfaces is the A side and which is the B side. The cartridge adaptor includes a housing for accommodating the second cartridge, and the housing has an external profile substantially identical with the external profile of the first cartridge, two surfaces respectively corresponding to an A side and a B side, an opening for insertion therethrough of at least the head and the disk driving mechanism, and an insertion restriction device for allowing insertion of the second cartridge to the cartridge adaptor only when the A side of the second cartridge is on the A side of the cartridge adaptor.

In one embodiment of the invention, the insertion restriction device includes a projection; and the identification device has a recess for engaging the projection only when the A side of the second cartridge is on the A side of the cartridge adaptor.

In one embodiment of the invention, the recess of the second cartridge is provided only on the A side for use of the second cartridge with a one-sided disk and also acts as a positioning hole for engaging a pin of a second disk apparatus designed to receive the second cartridge for preventing overinsertion of the second cartridge into the second disk apparatus; and the projection of the cartridge adaptor also acts as a positioning pin for engaging the positioning hole.

In one embodiment of the invention, the recess of the identification device includes an identification hole for allowing the disk apparatus to distinguish the A side from the B side of the cartridge adaptor.

In one embodiment of the invention, the second cartridge has at a leading end thereof an end face extending between two corners of the second cartridge, the two corners each having different shapes on the A side and the B side in order to prohibit erroneous insertion of the second cartridge for a one-sided disk into the disk apparatus and to restrict an insertion direction of the second cartridge for a two-sided disk and the second cartridge for the one-sided disk. One of the two corners of the second cartridge for the two-sided disk has a recess on one of the A side and the B side, and the other corner has one of a recess and a cutoff both on the A side and the B side. One of the two corners of the second cartridge for the one-sided disk has a recess on one of the A side and the B side, and the other corner has a shape symmetrical with the one of the two corners with respect to a center line thereof.

In one embodiment of the invention, the second cartridge has at a leading end thereof an end face extending between two corners of the second cartridge, the two corners each having different shapes on the A side and the B side in order to prohibit erroneous insertion of the second cartridge into the disk apparatus.

In one embodiment of the invention, one of the two corners of the second cartridge has a recess on one of the A side and the B side, and the other corner has one of a recess and a cutoff both on the A side and the B side.

In one embodiment of the invention, one of the two corners of the second cartridge has a recess on one of the A side and the B side, and the other corner has a shape symmetrical with the one of the two corners with respect to a center line thereof.

In still another aspect of the invention, in a combination of a cartridge adaptor mountable in a disk apparatus designed to perform at least one of data reproduction and data recording from and in a disk accommodated in a first cartridge provided with an identifier for providing information indicating one of a characteristic of the first cartridge and a characteristic of the disk accommodated in the first cartridge, and a second cartridge to be accommodated in the cartridge adaptor, the cartridge adaptor includes a housing for accommodating the second cartridge, and the housing has an external profile substantially identical with the external profile of the first cartridge, an opening for insertion therethrough of at least a head for at least one of recording and reproducing and a disk driving mechanism of the disk apparatus, and an identification detection section located at a corresponding position to the identifier of the first cartridge. The second cartridge is smaller in external profile than the first cartridge, and includes an opening for insertion therethrough of at least the head and the disk driving mechanism, an identifier for providing information indicating a characteristic of the second cartridge, and an identification information conveying device for conveying the information provided by the identifier of the second cartridge to the identification detection section of the cartridge adaptor.

In one embodiment of the invention, the identifier includes an identification hole and indicates the information based on whether the identification hole is opened or closed. The identification information conveying device includes a transmission aperture provided in a side surface of the second cartridge when the identification is opened. The identification detection section includes a detection hole provided at a corresponding position to the identifier of the first cartridge, a movable member movable to a first position in the transmission aperture when the identification hole is open and held in a second position displaced from the first position when the identification hole is closed, and an elastic member for biasing the movable member toward the first position. When the identification hole is open, the movable member moves to the first position by a biasing force of the elastic member, thereby opening the detection hole. When the identification hole is closed, the movable member moves to the second position against the biasing force of the elastic member, thereby closing the detection hole.

In one embodiment of the invention, the housing includes an insertion opening in a receptacle portion thereof for insertion therethrough of the second cartridge, and a lid connected to the receptacle portion for closing the insertion opening; and the lid includes the detection hole, the movable member and the elastic member.

In one embodiment of the invention, the cartridge adaptor comprises an erroneous deletion prohibiting mechanism having an end surface, an identification hole, and a transmission aperture provided on the side surface to be opened and closed by the end surface of the erroneous deletion prohibiting mechanism based on whether the second identification hole is opened or closed.

In one embodiment of the invention, the second cartridge includes an erroneous deletion prohibiting mechanism, and the cartridge adaptor includes an opening along which the erroneous deletion prohibiting mechanism is movable.

In one embodiment of the invention, the housing includes a receptacle portion having top and bottom sides, an insertion opening in the receptacle portion at one of the top and bottom sides, a lid pivotably movable relative to the receptacle portion to open, and a moving mechanism for moving the movable member in association with the movement of the lid.

In yet another aspect of the invention, in a combination of a disk apparatus for performing at least one of data reproduction and data recording from and in a first disk accommodated in a first cartridge, and a cartridge adaptor for accommodating a second cartridge and for allowing the disk apparatus to perform date reproduction and data recording from and in a second disk accommodated in the second cartridge, the second cartridge being smaller in external profile than the first cartridge and having at a leading end thereof an end face extended between two corners, the disk apparatus includes an erroneous insertion prohibiting mechanism for prohibiting insertion of an improper cartridge and prohibiting insertion of the first cartridge in an improper direction. The cartridge adaptor has at a leading end thereof an end face extended between two corners, and includes corner shape changing means for changing, in association with insertion of the second cartridge into the second cartridge, the shape of at least one of the two corners of the cartridge adaptor to one of a first shape which allows mounting of the cartridge adaptor in the disk apparatus and a second shape which prohibits mounting of the cartridge adaptor in the disk apparatus, based on the shape of at least one of the two corners of the second cartridge.

According to the present invention, the shutter of the second cartridge can be opened and closed by the shutter opening and closing mechanism of the disk apparatus. Accordingly, a shutter can be eliminated from the cartridge adaptor. This simplifies the structure of the cartridge adaptor, and enlarges the slot of the cartridge adaptor for accommodating the second cartridge.

Further according to the present invention, damage to the head of the disk apparatus and malfunction of the disk apparatus caused by insertion of the cartridge into the cartridge adaptor in a wrong direction or insertion of the cartridge adaptor into the disk apparatus in a wrong direction can be avoided.

Thus, the invention described herein makes possible the advantages of providing (1) a cartridge adaptor having a simple structure for facilitating mounting of a cartridge with a shutter in a disk apparatus, the cartridge having a different size from the size of a cartridge which the disk apparatus is designed to receive; (2) a cartridge adaptor for realizing correct reproduction of data or correct recording and reproduction of data in and from a disk by a disk apparatus, the disk being accommodated in a cartridge having a different size from the size of a cartridge which a disk apparatus is designed to receive, and a cartridge to be accommodated in such a cartridge adaptor; and (3) a cartridge adaptor for conveying identification information of a cartridge to a disk apparatus in a simple manner without changing the structure of the disk apparatus, the cartridge being smaller than a cartridge which the disk apparatus is designed to receive.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

A cartridge adaptor and a cartridge to be accommodated in the cartridge adaptor in a first embodiment according to the present invention will be described with reference to FIGS. 1 through 4.

Figure 1:
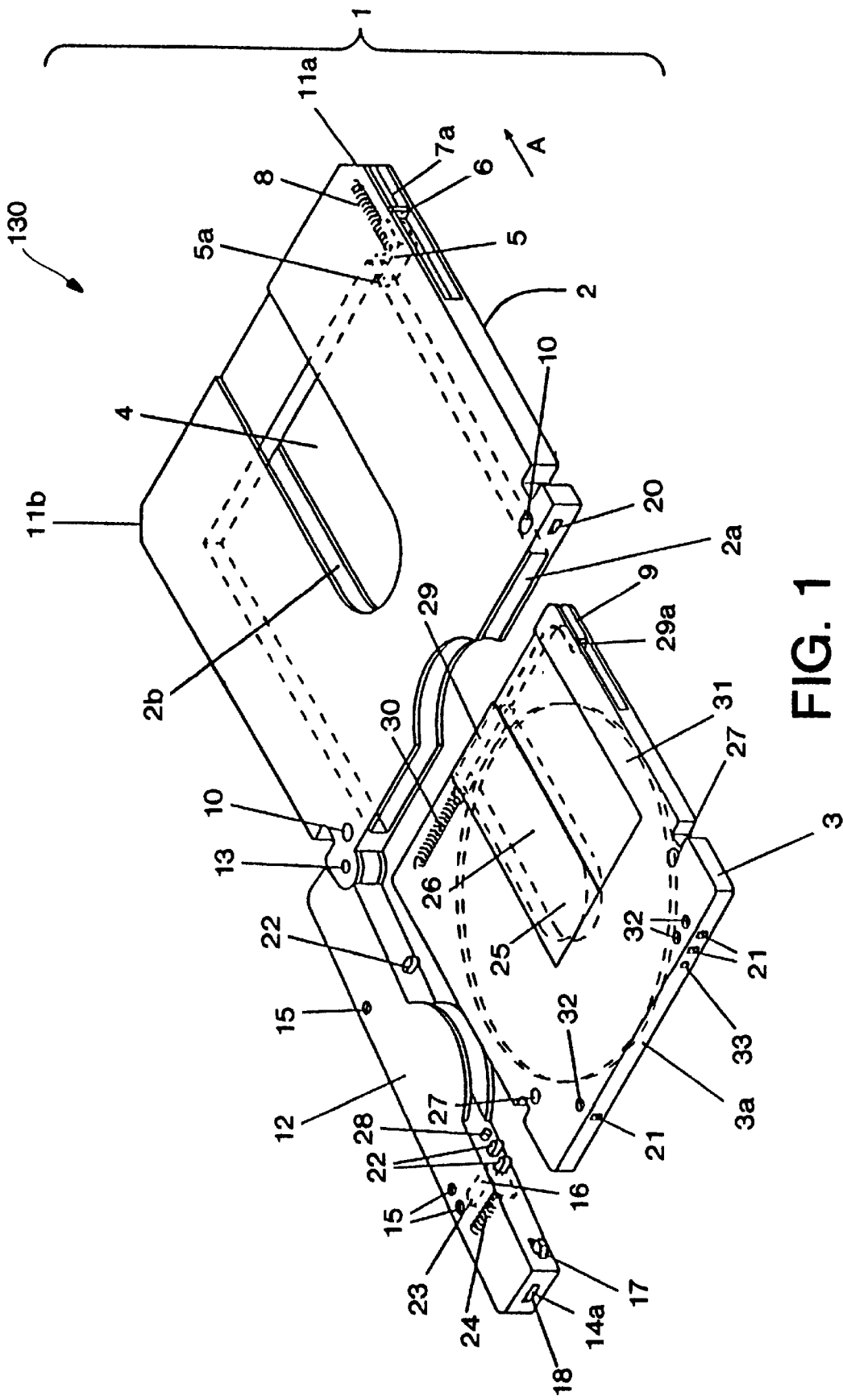
FIG. 1 is an isometric view of a cartridge adaptor and a cartridge to be accommodated in the cartridge adaptor in a first example according to the present invention.
Figure 2:
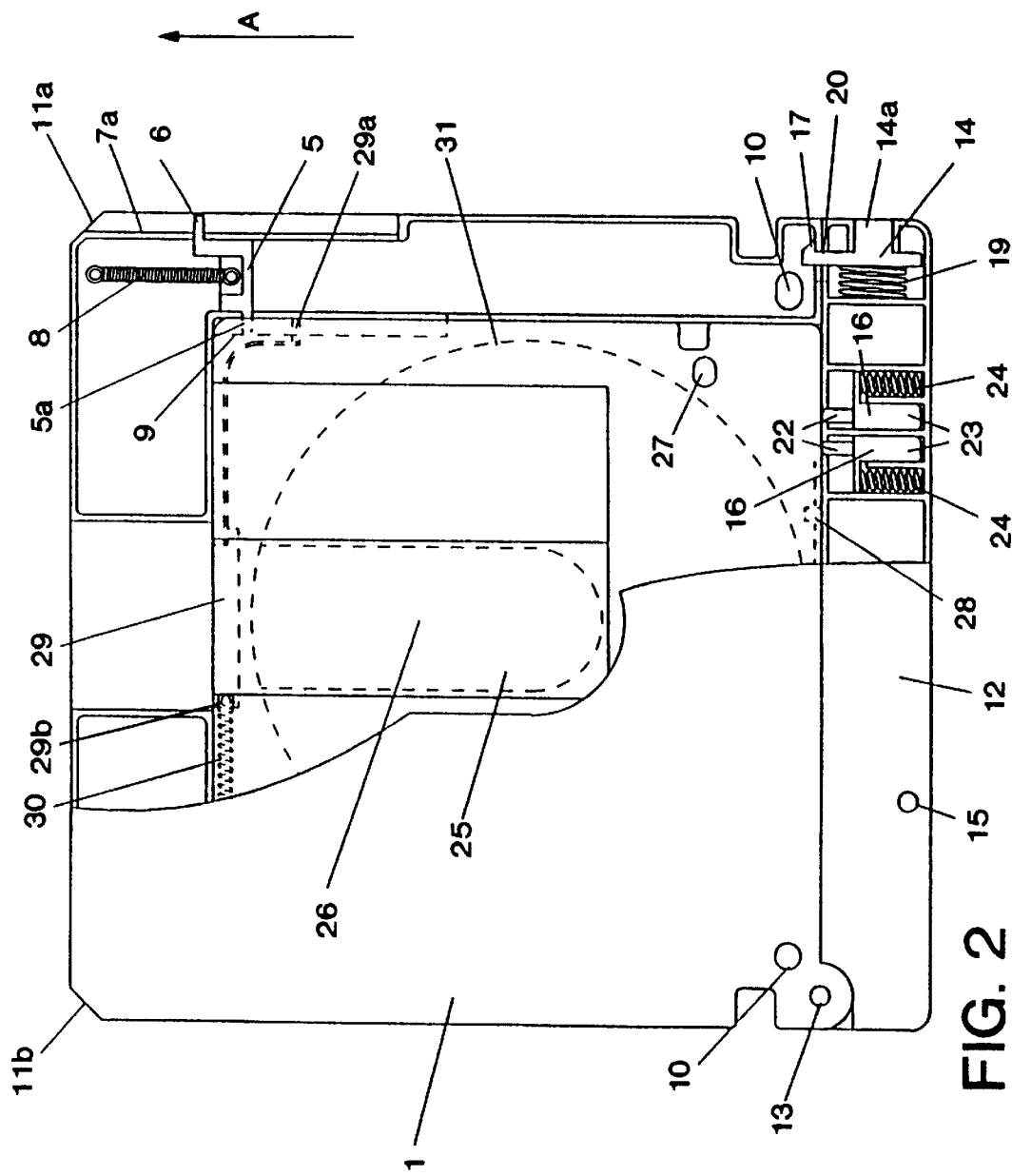
FIG. 2 is a partially cut top view of the cartridge adaptor in the state of accommodating the cartridge shown in FIG. 1.

FIG. 1 is an isometric view of a cartridge adaptor 130 and a cartridge 3 of the first example. The cartridge adaptor 130 in the state of accommodating the cartridge 3 is inserted into a disk apparatus (not shown in FIG. 1) designed to receive another cartridge (not shown). The cartridge adaptor 130 has the same size as the latter cartridge. Hereinafter, the latter cartridge will be referred to as the "first cartridge", and the former cartridge 3 to be accommodated in the cartridge adaptor 130 will be referred to as the "second cartridge". FIG. 2 is a partially cut top view of the cartridge adaptor 130 accommodating the second cartridge 3.

With reference to FIG. 1, the cartridge adaptor 130 has the following structure.

The cartridge adaptor 130 includes a housing 1 having a receptacle portion 2. The receptacle portion 2 has a slot 2b for accommodating the second cartridge 3, and an opening 4. Although the first cartridge is not shown, the first cartridge also includes an opening. The opening 4 of the second cartridge 3 has the same profile as the profile of the opening of the first cartridge. The second cartridge 3 has substantially the same external profile as the external profile of the first cartridge. Through the opening 4, a disk driving mechanism and the like of a driving device of the disk apparatus are inserted into the receptacle portion 2 of the cartridge adaptor 130.

The receptacle portion 2 has an insertion opening 2a through which the second cartridge 3 is inserted. A shutter opener 5 for opening a shutter 26 of the second cartridge 3 is located on a side wall of the slot 2b. The shutter opener 5 is slidable along a groove 7a formed in a side surface of the receptacle portion 2 and is biased in the direction of arrow A by a spring 8. As is best shown in FIG. 2, an end 6 of the shutter opener 5 projects into the groove 7a. Another end 5a of the shutter opener 5 projects through the side wall of the slot 2b, and is shaped to be inserted through a shutter opener groove 9 formed in a side surface of the second cartridge 3. A distance by which the shutter opener 5 can move is set to be longer than a distance by which the shutter 26 of the second cartridge 3 can move. The receptacle portion 2 has another groove (not shown) on the side face opposed to the side surface in which the groove 7a is formed.

As is best shown in FIG. 2, the receptacle portion 2 further has positioning holes 10 and slanting sections 11a and 11b. The positioning holes 10 are formed to correspond to positioning holes of the first cartridge. The slanting sections 11a and 11b are formed at corners of a leading end surface of the receptacle portion 2, and correspond to an erroneous insertion prohibiting mechanism of the disk apparatus described later.

The housing 1 has a lid 12 connected to the receptacle portion 2 to be pivotable about a support 13 for opening and closing the insertion opening 2a of the receptacle portion 2. The support 13 is located at an end of the lid 12. When the lid 12 closes the insertion opening 2a, the housing 1 has substantially the same profile as the profile of the first cartridge. The lid 12 has a locking member 14 at an end opposite to the end having the support 13. The locking member 14 includes a claw 17 projecting from a face of the lid 14 to be in contact with the second cartridge 3 and a switch 14a housed in a lock opening 18 located at the end opposite to the end having the support 13. The locking member 14 is biased by a spring 19 in such a direction that the claw 17 may engage an opening 20 when the lid 12 closes the insertion opening 2a. As is best shown in FIG. 1, the opening 20 is formed in a rear end surface of the receptacle portion 2 in which the insertion opening 2a is formed. When the switch 14a is pressed inside the lid 12 from the state shown in FIG. 2, the claw 17 is released from the opening 20.

The lid 12 includes circular openings 15, conveying members 16, and a cylindrical projection 28. The openings 15 act as an identifying section for conveying identification information concerning the second cartridge 3 to the disk apparatus. The openings 15 are formed so as to, when the lid 12 is closed, be located at the positions corresponding to identification holes of the first cartridge. The conveying members 16, which are provided in the corresponding number with the openings 15, convey the information provided by an identifier (described later) of the second cartridge 3 to the openings 15. The conveying members 16 each include an insertion section 22 which can be inserted into transmission apertures 21 (FIG. 1) formed in a rear surface 3a of the second cartridge 3 and a detection section 23 for opening and closing the corresponding opening 15. The conveying members 16 are slidable with respect to the lid 12 and are biased by elastic springs 24 so that the insertion section 22 will project from the face of the lid 12 contactable with the rear surface 3a of the second cartridge 3. The projection 28 is provided for restricting the direction in which the second cartridge 3 is inserted into the receptacle portion 2, and projects into the slot 2b when the lid 12 is closed.

The cartridge adaptor 130 is used for two-sided optical disks. Hereinafter, the top surface of the cartridge adaptor 130 in FIG. 1 is referred to as "the A side", and the bottom surface is referred to as "the B side". A one-sided cartridge adaptor has neither the opening 4 on the bottom side nor the slanting section 11b.

With reference to FIG. 1, the second cartridge 3 has the following structure.

The second cartridge 3 includes an opening 25 through which a reproducing or a recording and reproducing head and the disk driving mechanism of the disk apparatus are inserted, a shutter 26 for opening and closing the opening 25, and a positioning hole 27. As is mentioned above, the second cartridge 3 includes the shutter opener groove 9 formed in the side surface thereof. As is best shown in FIG. 2, a movable shutter opener 29 formed of a flexible material is guided along the shutter opener groove 9. The shutter opener 29 has a claw 29a at an end thereof, and another end 29b of the shutter opener 29 is connected with the shutter 26 by a screw (not shown) and engages a spring 30. The connection among the shutter opener 29, the shutter 26 and the spring 30 is described in detail in Japanese Laid-Open Patent Publication No. 61-236083, and detailed description is omitted here.

While a first disk (not shown) is accommodated in the first cartridge for accommodating the first disk, a second disk 31 is accommodated in the second cartridge 3 for accommodating the second disk 31. The second cartridge 3 has a central hole (not shown) which is located at the identical position as the position of a central hole of the first disk when mounted in the disk apparatus. As is mentioned above, the transmission apertures 21 for receiving the insertion sections 22 of the lid 12 are formed in the rear surface 3a of the cartridge 3. The rear surface 3a further has a recess 33 formed therein. The transmission apertures 21 are provided when identification holes 32 acting as an identifier are formed or opened in a top surface of the second cartridge 3. Information on the cartridge 3 is indicated based on the state of the identification holes 32. The identification holes 32 may be provided in different types, depending on a method of detection performed by the driving device. In this example, the identification holes 32 are each provided as a through-hole formed in the second cartridge 3. Such identification holes 32 can be used in a method for measuring a distance of movement of a mechanical switch provided in the disk apparatus and another method using a transmission type photointerruptor. The recess 33 is located at a position corresponding to the position of the projection 28 of the cartridge adaptor 130, and has a circular periphery for receiving the projection 28. The second cartridge 3 is used for two-sided optical disks. Hereinafter, the top surface of the second cartridge 3 in FIG. 1 is referred to as "the A side", and the bottom surface is referred to as "the B side". The recess 33 is positioned so as to receive the projection 28 only when the A side of the second cartridge 3 is inserted into the receptacle portion 2 of the cartridge adaptor 130 with the A side of the second cartridge 3 being on the A side of the cartridge adaptor 130 as is shown in FIG. 1. The projection 28 and the recess 33 act together as insertion restriction means for restricting the direction in which the second cartridge 3 is inserted into the receptacle portion 2.

The slot 2b of the cartridge adaptor 130 is positioned so that the position of the positioning holes 10 relative to the central hole of the second disk 31 in the state where the second cartridge 3 is held in the slot 2b can substantially correspond to the position of the positioning holes (not shown) of the first cartridge relative to the central hole of the first disk accommodated in the first cartridge. The opening 4 of the cartridge adaptor 130 is shaped to accommodate the opening 25 of the second cartridge 3.

The end 5a of the shutter opener 5 of the cartridge adaptor 130 is out of contact with the claw 29a of the shutter opener 29 of the second cartridge 3 in the state where the cartridge adaptor 130 is not inserted into the disk apparatus. The shutter opener 5 is set so as to contact the shutter opener 29 and move by the same distance as the distance of movement of the shutter 26 when the cartridge adaptor 130 is inserted into the disk apparatus.

With reference to FIGS. 1 and 2, the mounting operation of the second cartridge 3 in the cartridge adaptor 130 will be described.

The second cartridge 3 is inserted into the receptacle portion 2 of the cartridge adaptor 130 through the insertion opening 2a with the A side of the second cartridge 3 being on the A side of the cartridge adaptor 130. At this point, as is illustrated in FIG. 2, the end 5a of the shutter opener 5 of the cartridge adaptor 130 is inserted into the shutter opener groove 9 of the second cartridge 3 and stops in the vicinity of the claw 29a of the shutter opener 29 of the second cartridge 3 without contacting the claw 29a. Then, the lid 12 is pivoted in the direction of closing of the insertion opening 2a. The projection 28 of the lid 12 is inserted into the recess 33 of the second cartridge 3 and the claw 17 of the locking member 14 engages the opening 20, thereby securing the lid 12. In this state, the position of the positioning holes 10 of the cartridge adaptor 130 relative to the central hole of the second disk 31 substantially corresponds to the position of the positioning holes of the first cartridge relative to the central hole of the first disk accommodated in the first cartridge first cartridge accommodated in the first cartridge. Further, the opening 25 of the second cartridge 3 is accommodated in the opening 4 of the cartridge adaptor 130. Thus, the second cartridge 3 is properly mounted in the cartridge adaptor 130.

In the case when the second cartridge 3 is inserted into the receptacle portion 2 of the cartridge adaptor 130 with the A side of the second cartridge 3 being on the B side of the cartridge adaptor 130 and the lid 12 is pivoted in the direction of closing the insertion opening 2a, the projection 28 contacts a flat part of the rear surface of the second cartridge 3, thus preventing the claw 17 from engaging the opening 20. The lid 12 cannot be secured, and the second cartridge 3 cannot be mounted in the cartridge adaptor 130.

Figure 3A:
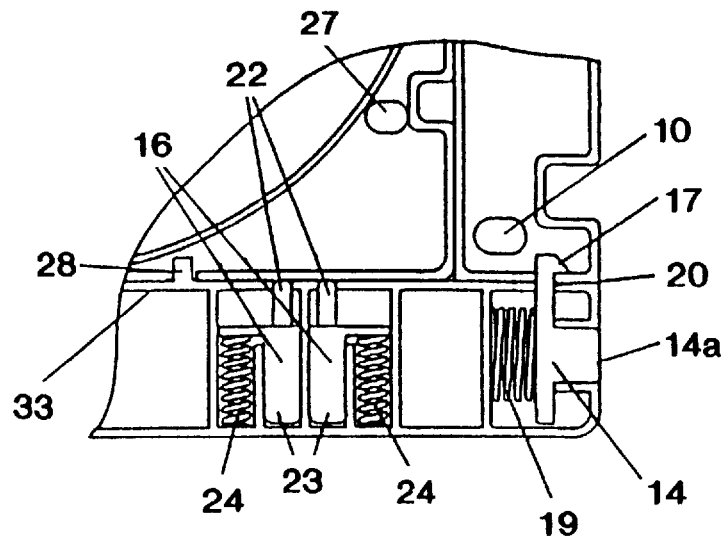
FIGS. 3A and 3B are partial top views of the cartridge adaptor and the cartridge accommodated in the cartridge adaptor illustrated in FIG. 1, illustrating the relationship between an information identification section of the cartridge and an information identifier of the cartridge adaptor.
Figure 3B:
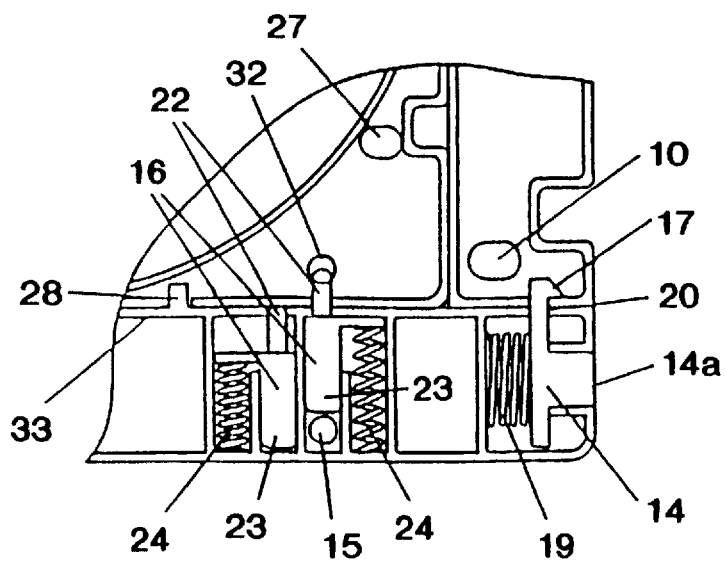

With reference to FIGS. 3A and 3B, the relationship between the identification holes 32 of the second cartridge 3 and the openings 15 of the cartridge adaptor 130 will be described. FIGS. 3A and 3B are partial top views of the cartridge adaptor 130 and the second cartridge 3 accommodated in the cartridge adaptor 130.

When the second cartridge 3 is mounted in the cartridge adaptor 130, the identification holes 32 of the second cartridge 3 and the openings 15 have the following relationship.

As is shown in FIG. 3A, in the state where the transmission apertures 21 or the identification holes 32 are not provided or are closed, the insertion section 22 contacts the flat part of the rear surface of the second cartridge 3. Accordingly, the conveying members 16 slide toward inside the lid 12 against the biasing force of the springs 24, and thus the detection sections 23 move to below the openings 15 to close the openings 15.

As is shown in FIG. 3B, in the state where the transmission apertures 21 and the identification holes 32 are provided or open, the insertion sections 22 are inserted into the transmission apertures 21 by the biasing force of the springs 24. Accordingly, the detection sections 23 slide toward outside the lid 12 to open the openings 15.

As is apparent from the above description, the state of each identification hole 32 is the same as the state of the corresponding opening 15.

Figure 4:
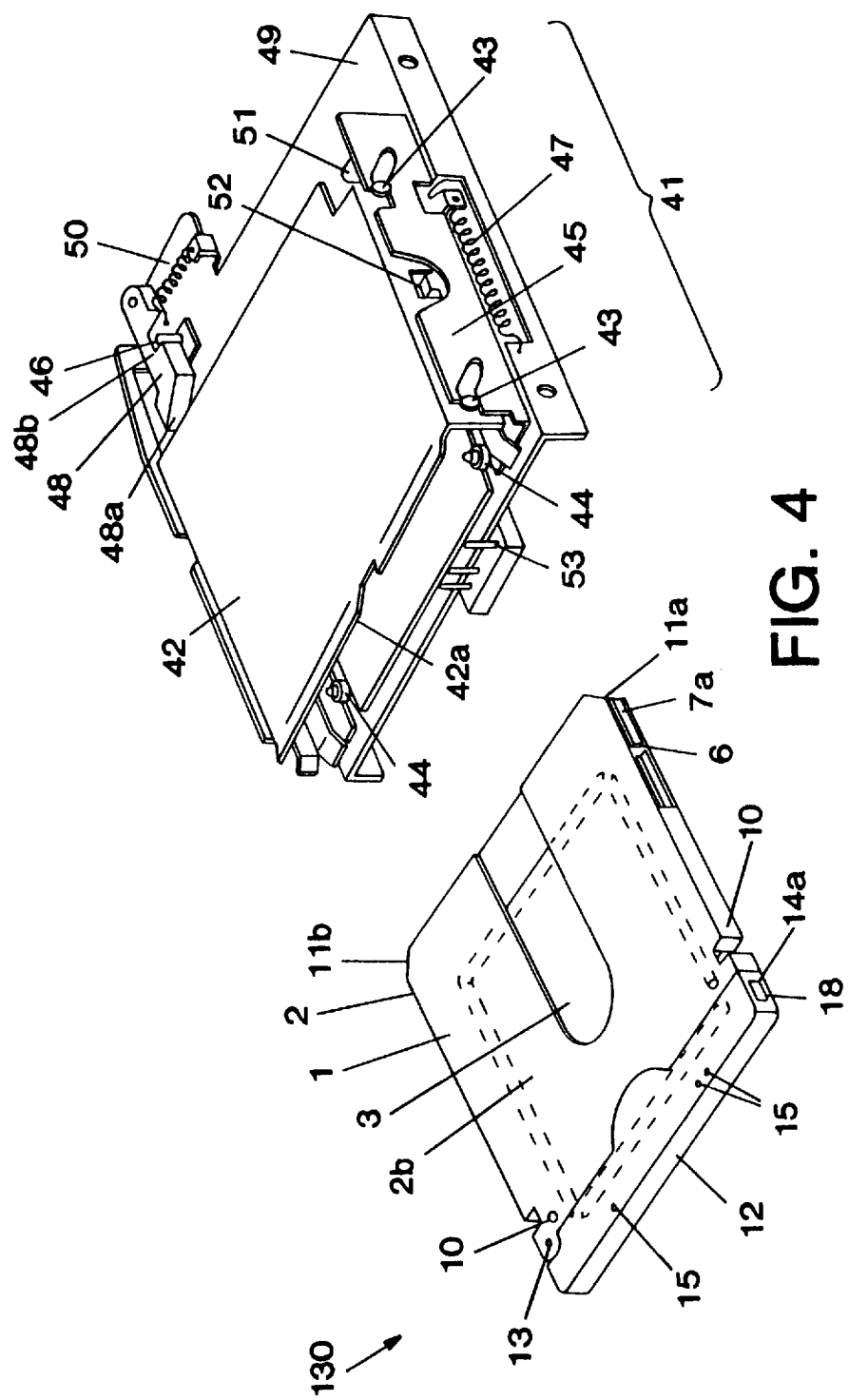
FIG. 4 is an isometric view of the cartridge adaptor shown in FIG. 1 and a disk apparatus for mounting the cartridge adaptor.

With reference to FIG. 4, the mounting operation of the cartridge adaptor 130 accommodating the second cartridge 3 in a loading mechanism 41 of the disk apparatus will be described. The disk apparatus includes a loading mechanism 41, the disk driving mechanism and the reproducing or recording and reproducing head. Neither the disk driving mechanism nor the head is shown.

First, the loading mechanism 41 will be described.

As is shown in FIG. 4, the loading mechanism 41 includes a substrate 49, a cartridge holding plate 42, pins 43 fixed to the cartridge holding plate 42, and positioning pins 44. The cartridge holding plate 42 has an opening 42a, through which the cartridge adaptor 130 or the first cartridge is inserted for recording and reproduction. The loading mechanism 41 further includes a cam 45 for vertically moving the cartridge holding plate 42, a pin 46 fixed on the cam 45, a spring 47 for biasing the cam 45 in such a direction as to move the cartridge holding plate 42 downward, and a lever 48 pivotably supported on the substrate 49. The lever 48 includes a slanting section 48a to be in contact with the cartridge adaptor 130 and an engaging section 48b for engaging the pin 46. A spring 50 is provided for biasing the lever 48 in such a direction to engage the pin 46. The cartridge holding plate 42 includes a claw 51 for prohibiting erroneous insertion of the cartridge adaptor 130, and a shutter opening claw 52 in shape for opening the shutter 26 of the second cartridge 3. Although not shown, another shutter opening claw identical with the shutter opening claw 52 is provided on the opposite side from the shutter opening claw 52. Switches 53 provided for detecting the identification holes of the first cartridge are fixed on a bottom part of the substrate 49. The switches 53 identify the information on the cartridge based on the state of the identification holes.

The insertion operation of the cartridge adaptor 130 into the loading mechanism 41 will be described.

When the cartridge adaptor 130 is inserted into the loading mechanism 41 with the A side of the cartridge adaptor 130 at the top, the cartridge adaptor 130 is properly positioned in the thickness direction and the width direction thereof by the cartridge holding plate 42. The end 6 of the shutter opener 5 engages the shutter opening claw 52 of the cartridge holding plate 42. Accordingly, as the cartridge adaptor 130 is further inserted into the loading mechanism 41, the end 5a of the shutter opener 5 slides along the shutter opener groove 9, thereby contacting the claw 29a of the shutter opener 29 of the second cartridge 3 (FIG. 2). Thus, the shutter 26 is opened, thereby exposing the second disk 31 in the opening 4. When the cartridge adaptor 130 is further inserted into the loading mechanism 41 until the slanting section 11a almost contacts the claw 51 of the cartridge holding plate 42, the cartridge adaptor 130 contacts the slanting section 48a of the lever 48, thereby pivoting and thus releasing the lever 48 from the pin 46 fixed on the cam 45. Accordingly, the cam 45 moves downward by the biasing force of the spring 47, and thus the cartridge holding plate 42 accommodating the cartridge adaptor 130, with the slanting section ha abutting the claw 51, moves downward. The positioning pins 44 are inserted to the positioning holes 10 of the cartridge adaptor 130, thereby positioning the cartridge adaptor 130 on the substrate 49. While the cartridge adaptor 130 is moved downward, the head and the motor disk of the disk apparatus are inserted into the opening 25 of the second cartridge 3. Since the opening 25 has a sufficient space for the insertion of the head and the motor disk, the head and the motor disk are kept out of contact with the second cartridge 3.

When the cartridge adaptor 130 is positioned on the substrate 49, the position of the central hole of the second disk 31 substantially corresponds to the position of the central hole of the first disk accommodated in the first cartridge in the state of being mounted in the disk apparatus. By such a setting, the second disk 31 is secured at a specified position of the disk driving mechanism. The second disk 31 is clamped to the disk driving mechanism by a known clamping method. The switches 53 are elevated toward the openings 15 of the cartridge adaptor 130 to identify the information on the second cartridge 3.

How information on the second cartridge 3 is detected by the switches 53 will be described in detail.

As is mentioned above, the state of each identification hole 32 is the same as the state of the corresponding opening 15. For example, in a system where two identification holes 32 are provided at the maximum, information on the cartridge 3 is indicated by whether (a) two identification holes are provided or open, (b) only the right identification hole is provided or open, (c) only the left identification hole is provided or open, or (d) no identification hole is provided or open. The state (a), (b), (c) or (d) is detected by elevation of each switch 53. If the opening 15 is opened, namely, if the identification hole 32 is provided or open, the switch 53 is inserted through the opening 15 and reaches a bottom surface of the cartridge holding plate 42. If the opening 15 is closed, namely, if the identification hole 32 is not provided or is closed, the switch 53 contacts the B side of the cartridge adaptor 130 and further elevation is prevented. By measuring the distance by which each switch 53 is elevated, the state of each identification hole 32 is detected. By combining the states of the two identification holes 32, the information on the second cartridge 3 is detected.

After the information on the second cartridge 3 is detected, the disk driving mechanism of the disk apparatus rotates to record data in or reproduce data from the A side of the second disk 31.

When the cartridge adaptor 130 is inserted into the loading mechanism 41 with the B side of the cartridge adaptor 130 at the top, the end 6 of the shutter opener 5 engages the shutter opening claw 52 to open the shutter 26 in the same manner as mentioned above. The slating section 11b abuts the claw 51 and the cartridge adaptor 130 is mounted in the loading mechanism 41 in the same manner as mentioned above. Thus, data is recorded in or reproduced from the side B of the second disk 31.

In the case when the cartridge adaptor 130 is inserted into the loading mechanism 41 in a wrong direction, for example, from the side of the lid 12, the corners of the lid 12, which are not slanted, contact the claw 51 and thus further insertion of the cartridge adaptor 130 is prohibited. In this manner, erroneous insertion of and damage to the cartridge adaptor 130 caused by the erroneous insertion are prevented.

With the cartridge adaptor 130 and the second cartridge 3 in the first example according to the present invention, the shutter 26 of the second cartridge 3 can be opened and closed by engagement of the claw 52 of the loading mechanism 41 and the shutter opener 5. By such a mechanism, a shutter can be eliminated from the cartridge adaptor 130. This simplifies the structure of the cartridge adaptor 130 and enlarges the slot 2b for easier accommodation of the second cartridge 3.

Further in this example, the shutter opener 5 of the cartridge adaptor 130, after engaging the claw 52 of the loading mechanism 41, contacts the shutter opener 29 of the second cartridge 3 and moves the same distance with the moving distance of the shutter 26. By such a mechanism, the shutter 26 of the second cartridge 3 which is shorter than the shutter of the first cartridge can certainly be opened.

The projection 28 of the lid 12 is inserted into the recess 33 only when the cartridge 3 is inserted into the cartridge adaptor 130 with the A side of the cartridge 3 being on the A side of the cartridge adaptor 130. In this manner, reverse insertion of the second cartridge 3, and further malfunction of the disk apparatus caused by such reverse insertion can be prohibited.

Information indicated by the identifier of the second cartridge 3, namely, the identification holes 32 is conveyed through the conveying members 16 to the openings 15 provided at the positions corresponding to the positions of identification holes of the first cartridge. Accordingly, identification information on the second cartridge 3 is easily transmitted to the disk apparatus using the cartridge adaptor 130 without changing the structure of the disk apparatus.

The conveying members 16 for conveying the information provided by the identification holes 32 of the second cartridge 3 to the openings 15, the openings 15 for conveying the information on the second cartridge 3 to the disk apparatus, and the springs 24 for biasing the conveying members 16 in such a direction as to project the insertion sections 22 toward outside the lid 12 are all provided in the lid 12. Due to such a structure, the insertion sections 22 which are inserted into the transmission apertures 21 when the lid 12 is closed comes out of the transmission apertures 21 when the lid 12 is opened to mount or dismount the second cartridge 3. No extra operation is necessary to release the insertion section 22 from the transmission aperture 21.

EXAMPLE 2

Figure 5:
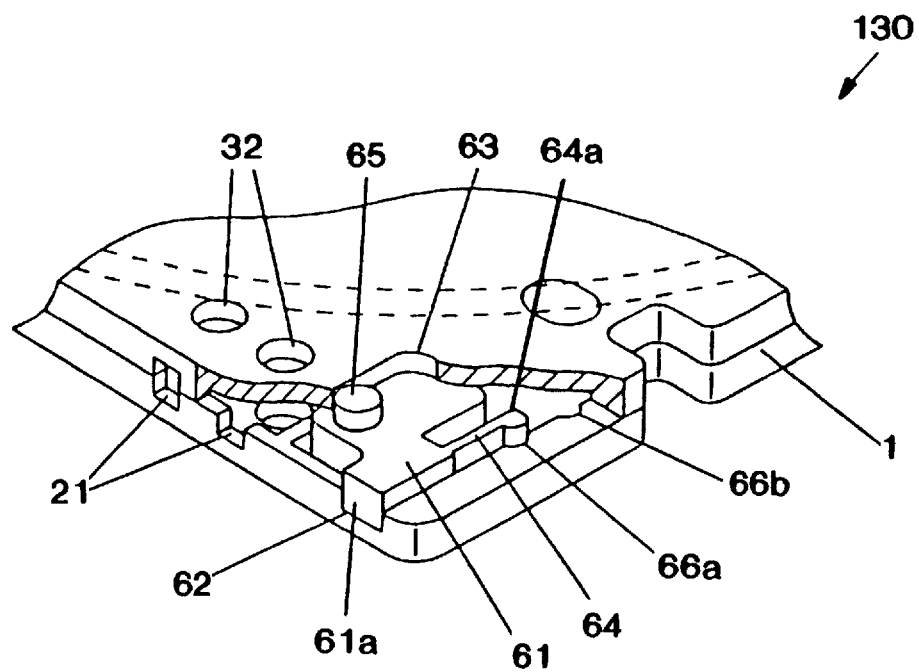
FIG. 5 is a partial isometric view of a second cartridge in a second example according to the present invention.
Figure 6A:
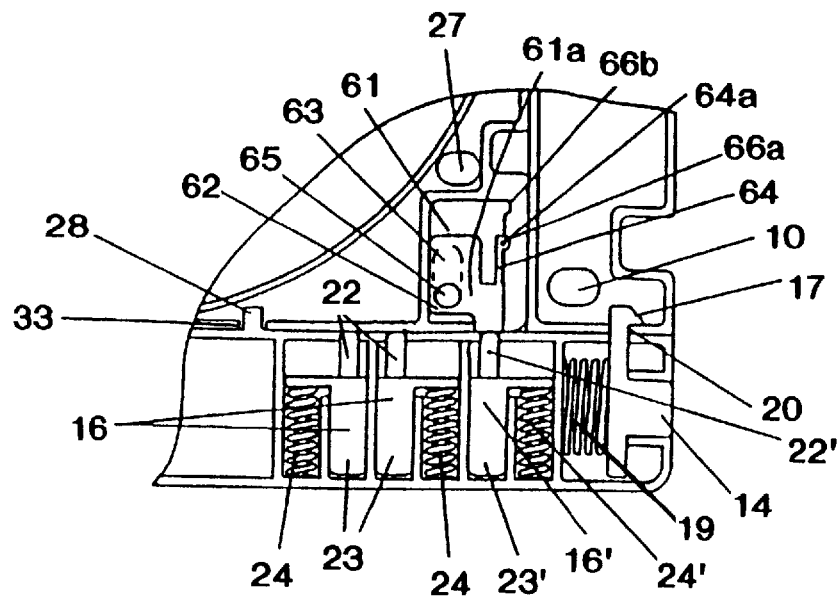
FIGS. 6A and 6B are partial top views of the second cartridge shown in FIG. 5 accommodated in a cartridge adaptor in the second example.
Figure 6B:
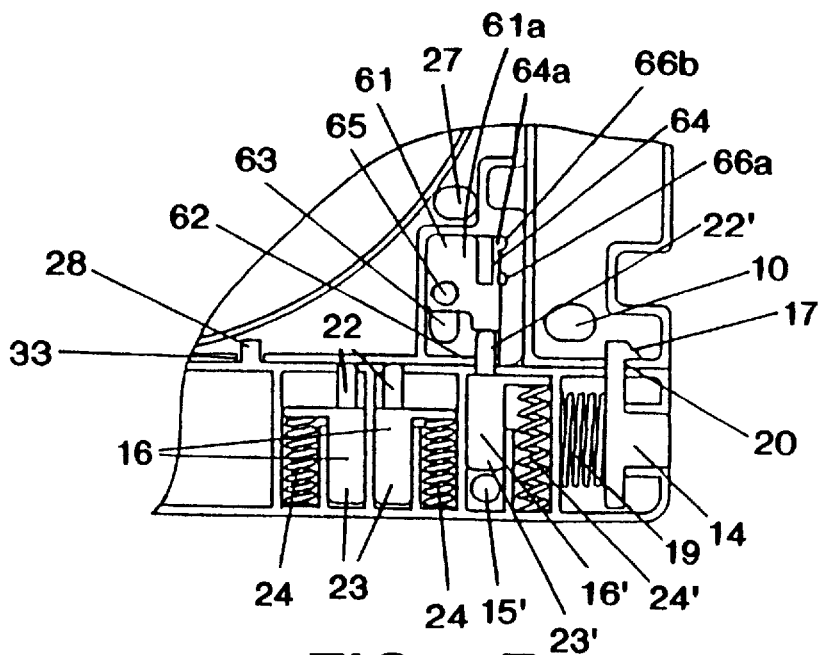

With reference to FIGS. 5, 6A and 6B, a cartridge adaptor and a second cartridge to be accommodated in the cartridge adaptor in a second example according to the present invention will be described. FIG. 5 is a partial isometric view of a second cartridge 3 in the second example. FIGS. 6A and 6B are partial top views of the second cartridge 3 inserted into a cartridge adaptor 130.

As is illustrated in FIG. 5, the second cartridge 3 includes an erroneous deletion prohibiting member 61, a conveying hole 62, and a lengthy detection hole 63. The erroneous deletion prohibiting member 61 includes an opening and closing section 61a, a positioning section 64, and a projection 65. The opening and closing section 61a is engageable with the conveying hole 62. The erroneous deletion prohibiting member 61 is located below the detection hole 63, and movable between a position for opening the detection hole 63 (described below with reference to FIG. 6B) and another position for closing the detection hole 63 (described below with reference to FIG. 6A). The positioning section 64 is swingable, and a tip 64a of the positioning section 64 is engageable with a recess 66a or 66b to position the erroneous deletion prohibiting member 61 to the position for opening the detection hole 63 or the position for closing the detection hole 63. The projection 65 is erected on the erroneous deletion prohibiting member 61 to be located in the detection hole 63. The erroneous deletion prohibiting member 61 is movable by sliding the projection 65 by a claw or the like along the detection hole 63. Except for the above-described parts, the second cartridge 3 has the same structure with the structure of the second cartridge 3. Although the erroneous deletion prohibiting member 61 and the related elements are only shown in one side of the cartridge 3, these elements may be provided on both sides of an end of the second cartridge 3.

As is shown in FIGS. 6A and 6B, the cartridge adaptor 130 includes, in addition to the structure of the cartridge adaptor 130, a conveying member 16' engageable with the conveying hole 62, and an opening 15' and a spring 24' both corresponding to the conveying hole 62.

With reference to FIGS. 6A and 6B, operation of erroneous deletion prohibition performed by the second cartridge 3 and the cartridge adaptor 130 will be described.

When the erroneous deletion prohibiting member 61 is moved to the position shown in FIG. 6A by sliding the projection 65 along the detection hole 63, the erroneous deletion prohibiting member 61 closes the detection hole 63, and the opening and closing section 61a engages the conveying hole 62. As in the case where the identification holes 32 are not provided in the first example, an insertion section 22' of the conveying member 16' contacts the opening and closing section 61a in engagement with the conveying hole 62, and thus the conveying member 16' moves toward inside the lid 12 against the biasing force of the spring 24'. At this point, a detection section 23' of the conveying member 16' moves to below the opening 15', thereby closing the opening 15'.

When the erroneous deletion prohibiting member 61 is moved to the position shown in FIG. 6B in the same manner as is described above, the erroneous deletion prohibiting member 61 opens the detection hole 63. Simultaneously, the opening and closing section 61a is released from the conveying hole 62, thereby opening the conveying hole 62. As in the case when the identification holes 32 are provided in the first example, the insertion section 22' is inserted into the conveying hole 62 by the biasing force of the spring 24'. The detection section 23' moves toward outside the lid 12, thereby opening the opening 15'.

In the second example, the conveying hole 62 is opened or closed using the opening and closing section 61a of the erroneous deletion prohibiting member 61. In this way, the state of the erroneous deletion prohibiting member 61 of the second cartridge 3 is conveyed to the disk apparatus by a simple mechanism.

Figure 7:
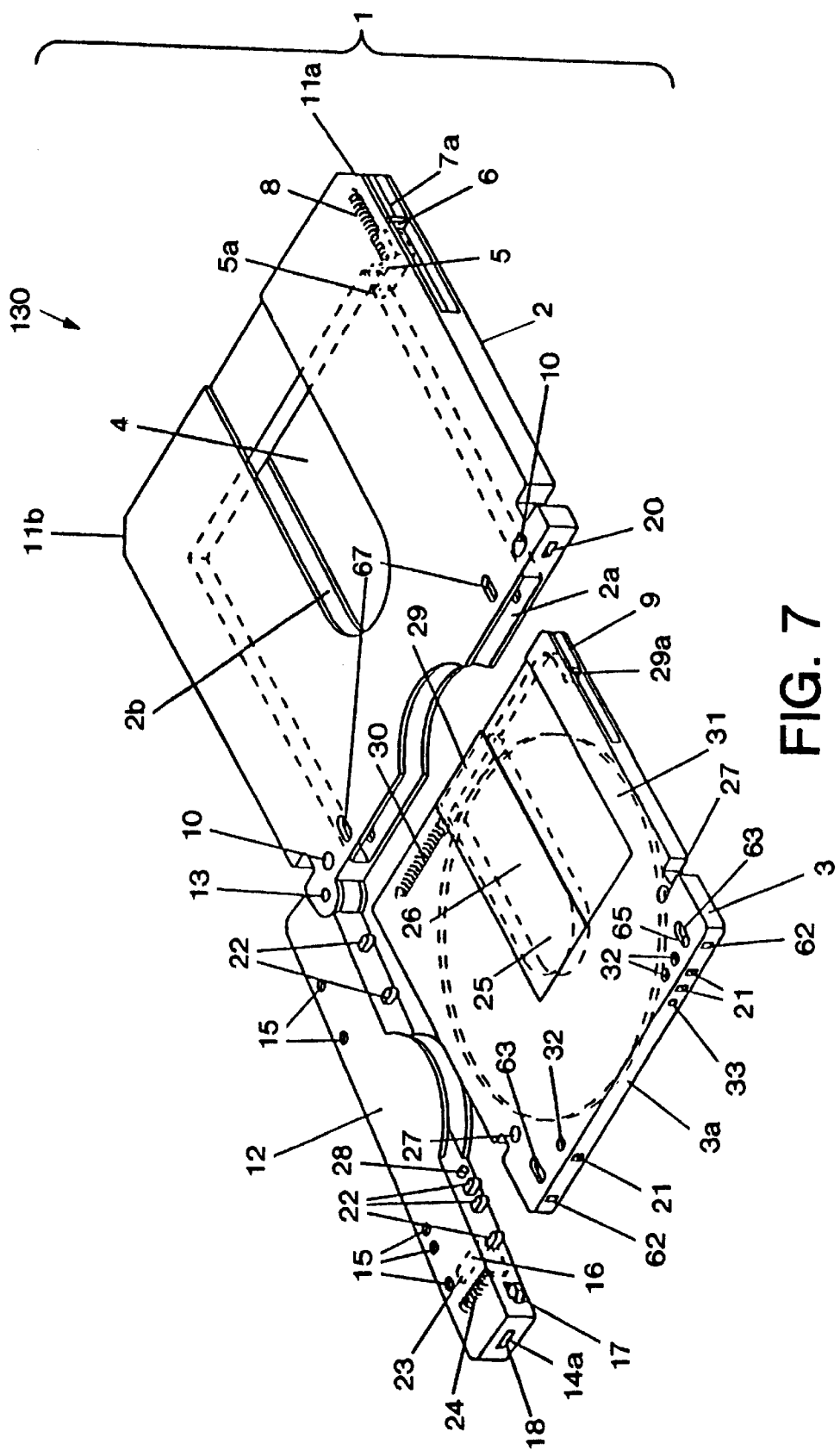
FIG. 7 is an isometric view of the second cartridge and the cartridge adaptor in a modification of the second example.

FIG. 7 is an isometric view of the cartridge 3 and the cartridge adaptor 130 in a modification of the second example. In FIG. 7, the cartridge adaptor 130 has openings 67 at positions corresponding to the positions of the detection holes 63 of the second cartridge 3. By such a structure, the erroneous deletion prohibiting member 61 can be moved between the above-mentioned two positions without dismounting the second cartridge 3 from the cartridge adaptor 130.

EXAMPLE 3

With reference to FIGS. 8 through 12D, a cartridge adaptor and a cartridge to be accommodated in the cartridge adaptor in a third example according to the present invention will be described.

Figure 8:
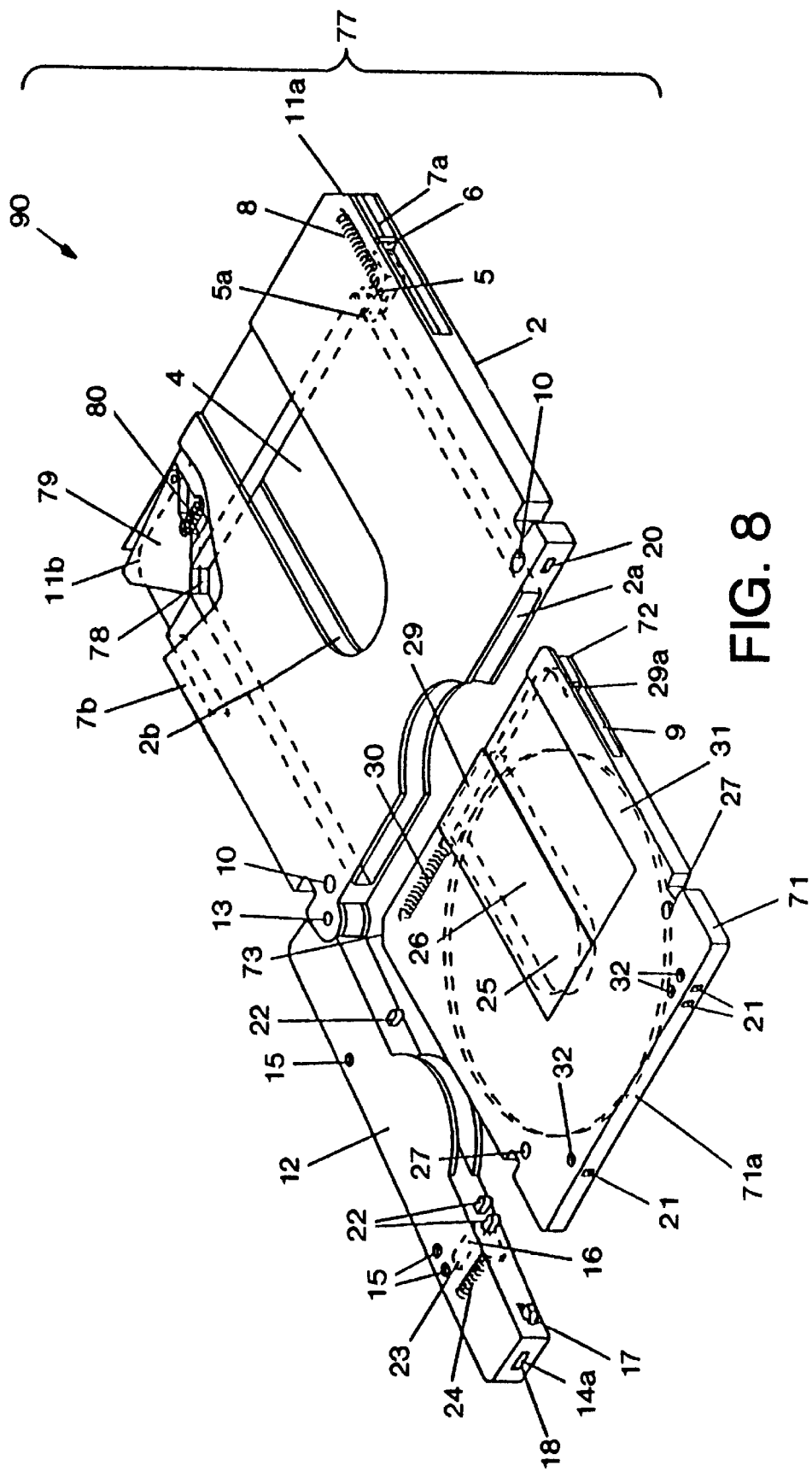
FIG. 8 is an isometric view of a cartridge adaptor and a second cartridge to be accommodated in the cartridge adaptor and used for a two-sided disk in a third example according to the present invention.
Figure 9:
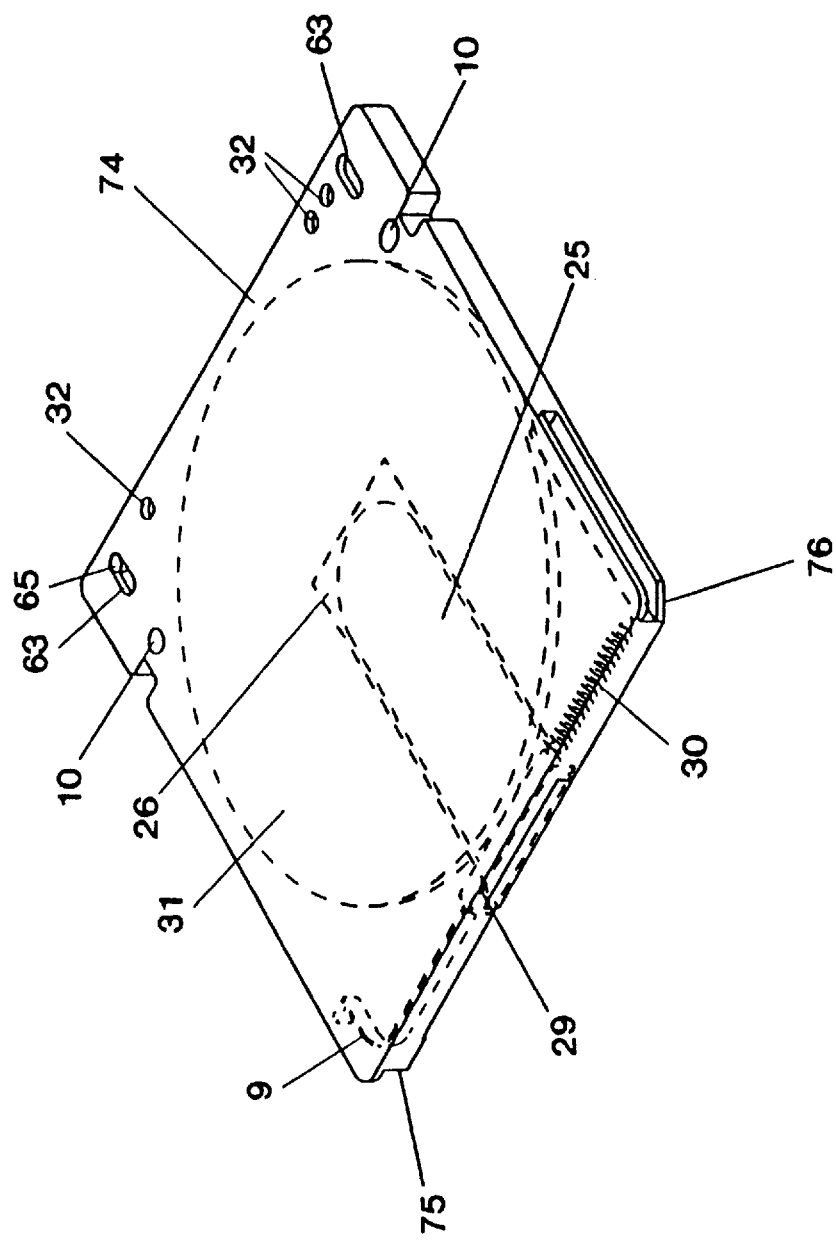
FIG. 9 is an isometric view of a second cartridge used for a one-sided disk.
Figure 11:
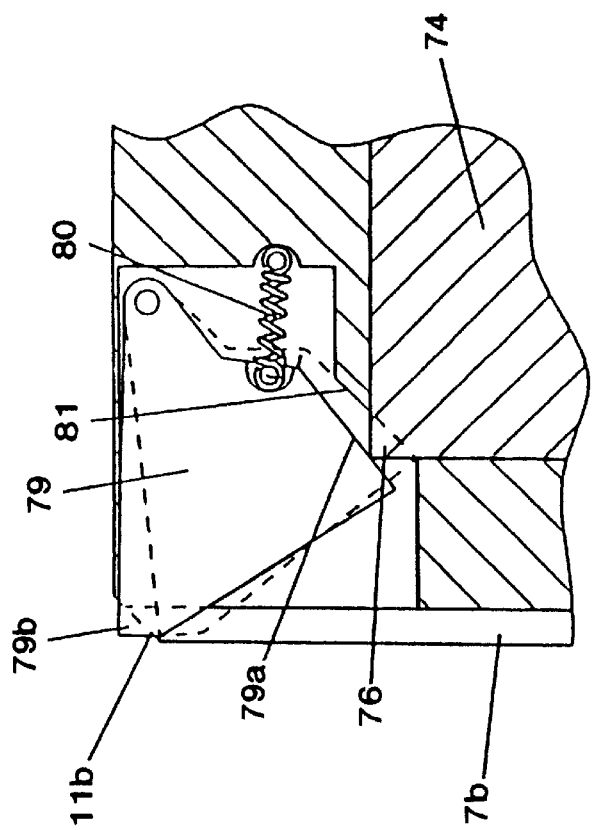
FIG. 11 is a partial top view of the cartridge adaptor in the state of accommodating the second cartridge for the one-sided disk illustrated in FIG. 9.
Figure 10:
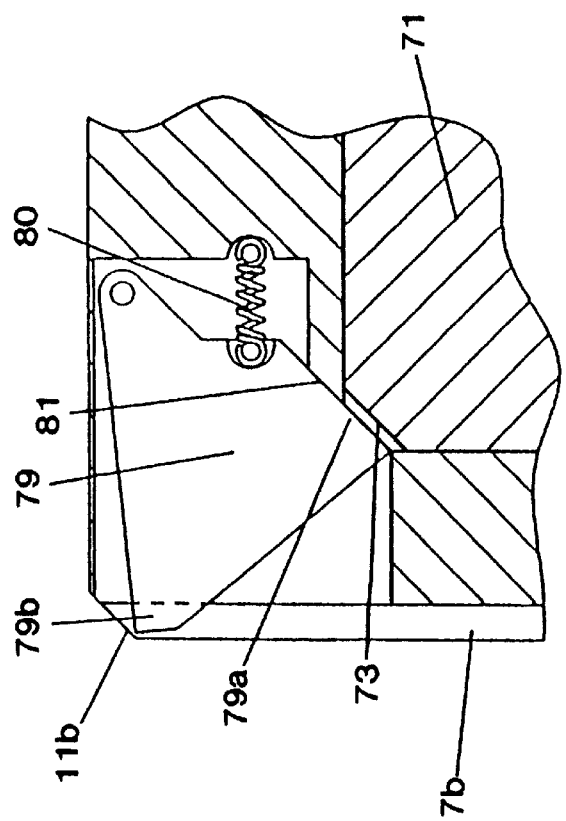
FIG. 10 is a partial top view of the cartridge adaptor in the state of accommodating the second cartridge for the two-sided disk illustrated in FIG. 8.
Figure 12A:
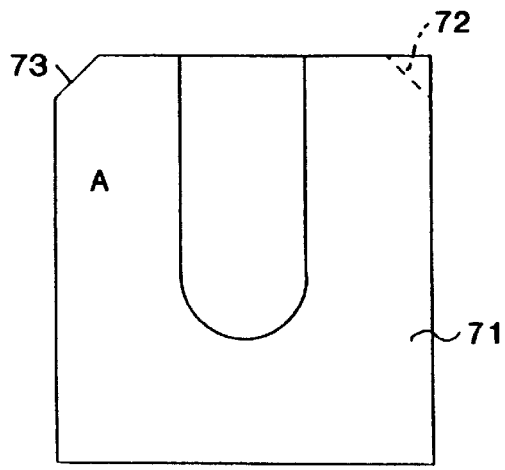
FIG. 12A is a plan view of the second cartridge for the two-sided disk seen from the A side.
Figure 12B:
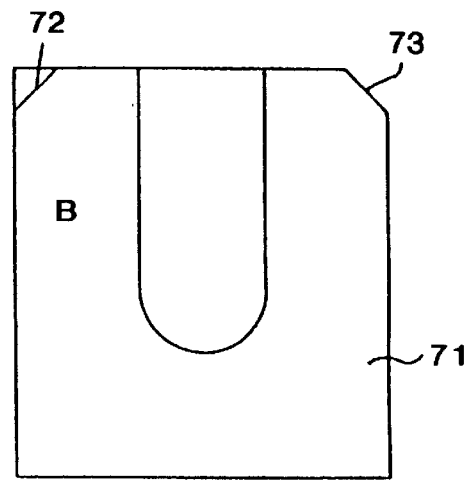
FIG. 12B is a plan view of the second cartridge for the two-sided disk seen from the B side.
Figure 12C:
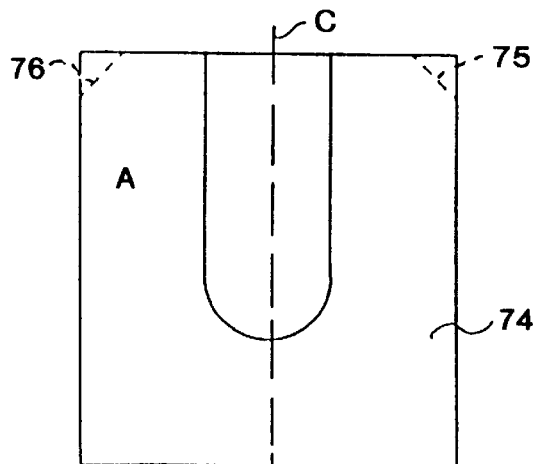
FIG. 12C is a plan view of the second cartridge for the one-sided disk seen from the A side.
Figure 12D:
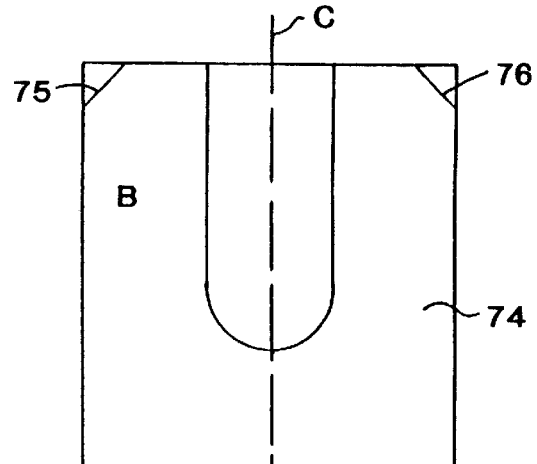
FIG. 12D is a plan view of the second cartridge for the one-sided disk seen from the B side.

FIG. 8 is an isometric view of a cartridge adaptor 90 and a second cartridge 71 to be accommodated in the cartridge adaptor 90 in the third example. The second cartridge 71 is used for a two-sided disk. FIG. 9 is an isometric view of a second cartridge 74 used for a one-sided disk. FIG. 10 is a partial top view of the cartridge adaptor 90 in the state of accommodating the second cartridge 71 for the two-sided disk. FIG. 11 is a partial top view of the cartridge adaptor 90 in the state of accommodating the second cartridge 74 for the one-sided disk. FIG. 12A is a plan view of the second cartridge 71 seen from the A side; FIG. 12B is a plan view of the second cartridge 71 seen from the B side; FIG. 12C is a plan view of the second cartridge 74 seen from the A side; and FIG. 12D is a plan view of the second cartridge 71 seen from the B side. In the case of the second cartridge 74 for the one-sided disk, data reproduction and data recording is performed from and on the A side. Elements identical with those in the first example bear identical reference numerals therewith, and explanation thereof will be omitted.

The second cartridge 71 for the two-sided disk has at a leading end thereof an end face extending between two corners of the second cartridge 71. As is shown in FIGS. 8, 12A and 12B, a first corner of the two corners is cut off by half of the thickness of the second cartridge 71 to form a recess 72 only on the B side. At a second corner of the two corners, a triangular portion having the same profile as the profile of the recess 72 is cut off to form the slanting section 73, but the triangular portion is cut off on both of the A side and the B side. The second cartridge 71 does not have the recess 33.

The second cartridge 74 for the one-sided disk has at a leading end thereof an end face extending between two corners of the second cartridge 74. As is shown in FIGS. 9, 12C and 12D, a first corner of the two corners is cut off by the same thickness as the recess 72 of the second cartridge 71 to form a recess 75 only on the B side. A second corner of the two corners has a recess 76 only on the B side having the identical profile as the profile of the recess 72. Thus, the second cartridge 74 is symmetrical with respect to a central line C.

As is illustrated in FIG. 8, the cartridge adaptor 90 includes a housing 77 having a receptacle portion 72 and the lid 12 pivotably connected with the receptacle portion 72. The receptacle portion 72 has a slot 72b for accommodating the second cartridge 71 or 74. The receptacle portion 72 further includes a triangular projection 78 at a corner of the slot 72b. The height of the projection 78 is half of the thickness of the second cartridge 71 at the maximum. The projection 78 is located to avoid contact with the slanting section 73 of the second cartridge 71 in the state where the second cartridge 71 is accommodated in the cartridge adaptor 71.

The cartridge adaptor 90 further includes a shape changing plate 79 for changing the shape of the slanting section 11b of the housing 77. The shape changing plate 79 is pivotably supported inside the housing 77. As is illustrated in FIG. 10, the shape changing plate 79 includes a first face 79a contactable with the A side of the second corner of the second cartridge 74 and a second face 79b contactable with the claw 51 (FIG. 4) for prohibiting erroneous insertion of the second cartridge 74 into the loading mechanism 41. The shape changing plate 79 is biased by a spring 80 in such a direction as to keep the second face 79b inside the slanting section 11b. In the state where no second cartridge is inserted, the first face 79a of the shape changing plate 79 partially contacts a stopping section 81 provided in the housing 77. The face 79a covers a corner of the slot 72b and is retained at such a position as to be kept out of contact with the slanting section 73 of the second cartridge 71 (FIG. 10) but as to be in contact with the A side of the second cartridge 74. Accordingly, the second face 79b is in a groove 7b formed on the side surface of the housing 77 (mentioned in the first example but not shown in FIG. 1), inside the slanting section 11b of the housing 77. The shape changing plate 79 and the groove 7b interpose a space therebetween through which the claw 52 of the loading mechanism 41 (FIG. 4) and another claw on the opposite side from the claw 52 of the loading mechanism 41 can pass.

The mounting operation of the second cartridges 71 and 74 in the cartridge adaptor 90 will be described.

First, the mounting operation of the second cartridge 71 accommodating the two-sided disk will be described.

When the second cartridge 71 is inserted into the receptacle portion 72 of the cartridge adaptor 90 with the A side of the second cartridge 71 being on the A side of the cartridge adaptor 90, the projection 78 properly abuts the slanting section 73. The lid 12 is closed, and the second cartridge 71 is mounted in the cartridge adaptor 90.

Since the first face 79a of the shape plate 79 and the slanting section 73 are kept out of contact with each other as is mentioned above, the slanting section 11b of the housing 77 maintains the shape thereof. Accordingly, the external profile of the cartridge adaptor 90 in the state of accommodating the second cartridge 71 seen from the A side is the same as the external profile thereof seen from the B side. Thus, the cartridge adaptor 90 can be mounted in the disk apparatus and recording and reproduction can be performed with either side of the cartridge adaptor 90 at the top, as in the first example.

In the case when the second cartridge 71 is inserted into the cartridge adaptor 90 with the B side of the second cartridge 71 being on the A side of the cartridge adaptor 90, the A side of the first corner of the second cartridge 71 contacts the projection 78, and further insertion is prohibited. Accordingly, the claw 17 of the locking member 14 in the lid 12 does not engage the opening 20, and thus the second cartridge 71 cannot be mounted.

Next, mounting of the second cartridge 74 accommodating the one-sided disk in the cartridge adaptor 90 will be described.

When the second cartridge 74 is inserted into the receptacle portion 72 of the cartridge adaptor 90 with the A side of the second cartridge 74 being on the A side of the cartridge adaptor 90, the projection 28 is inserted into the recess 76 of the second cartridge 74. The lid 12 is closed, and thus the second cartridge 74 is mounted in the cartridge adaptor 90.

FIG. 11 shows the state of the shape changing plate 79 at this point. The A side of the second corner of the second cartridge 74 contacts the first face 79a of the shape changing plate 79, thereby pivoting the shape changing plate 79 from the position indicated by the dashed line to the position indicated by the solid line against the biasing force of the spring 80. The second face 79b projects from the slanting section 11b of cartridge adaptor 90, thereby forming a right-angled corner.

Accordingly, in the case when the cartridge adaptor 90 in the state of accommodating the second cartridge 74 is inserted into the loading mechanism 41 with the B side of the cartridge adaptor 90 at the top, the second face 79b contacts the claw 51 in the loading mechanism 41 (FIG. 4), thereby prohibiting further insertion of the cartridge adaptor 90. By such structure, damage to the disk apparatus and to the second cartridge 74 caused by erroneous insertion is prevented.

In the case when the second cartridge 74 is inserted into the receptacle portion 72 of the cartridge adaptor 90 with the B side of the cartridge adaptor 74 being on the A side of the cartridge adaptor 90, the projection 78 contacts the A side of the first corner of the second cartridge 74, thereby prohibiting further insertion of the second cartridge 74. Accordingly, the second cartridge 74 cannot be mounted.

Figure 13:
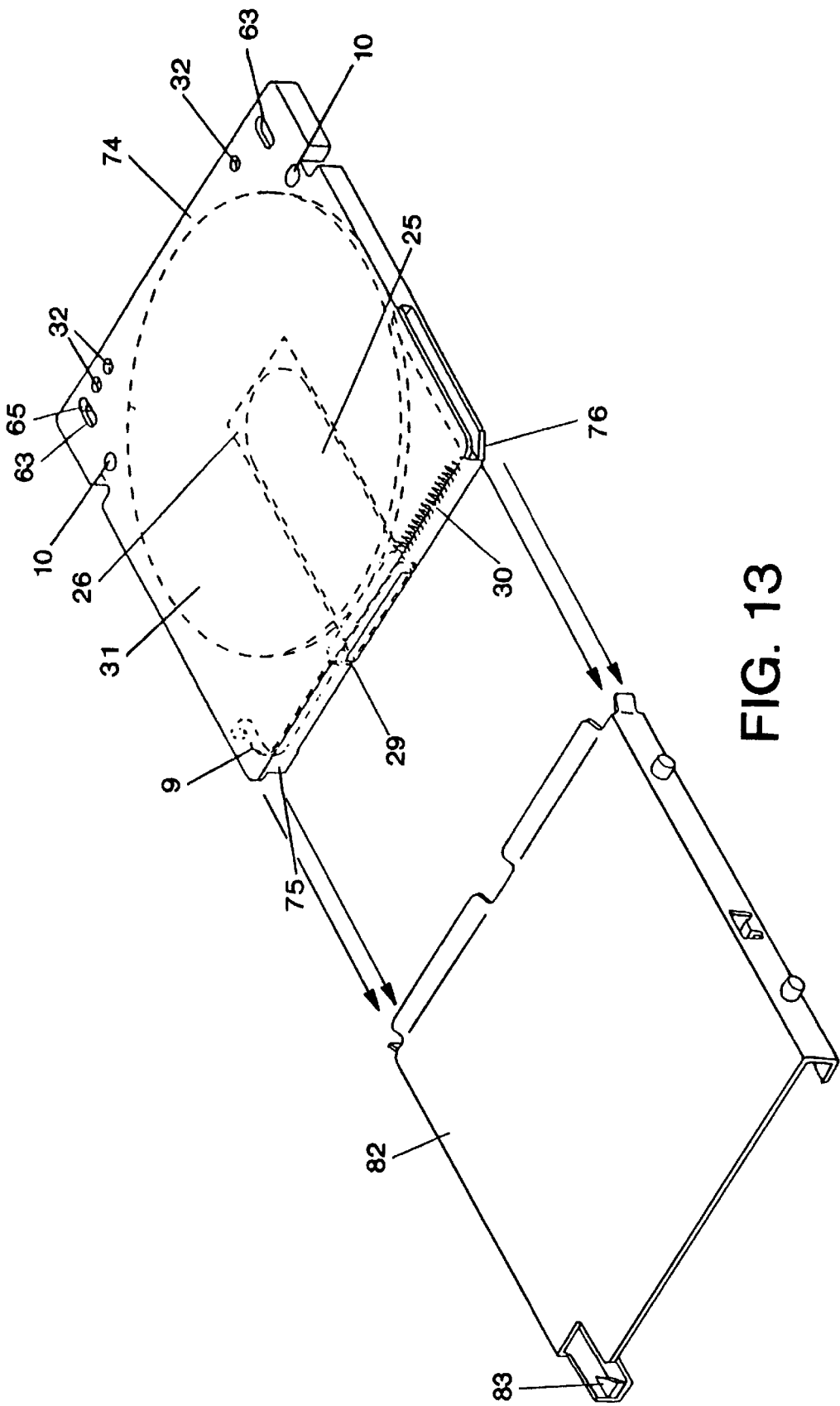
FIG. 13 is an isometric view of a cartridge holding plate of a disk apparatus designed to receive the second cartridges for the two-sided disk and the one-sided disk.

FIG. 13 is an isometric view of a cartridge holding plate 82 of a disk apparatus designed to receive the second cartridge 71 or 74.

As is shown in FIG. 13, the cartridge holding plate 82 includes a claw 83. The claw 83 has a height which is half of the thickness of the second cartridges 74 and 71 at the maximum so as to be relatively inserted into the recess 72 of the second cartridge 71 and the recess 75 of the second cartridge 74 but not to interfere the slanting section 73 of the second cartridge 71. By provision of the claw 83, the second cartridges 71 and 74 can be inserted with either the A or B side at the top, and the second cartridge 74 can be inserted only with the A side at the top.

In the third example, the second cartridge 71 for the two-sided disk and the second cartridge 74 for the one-sided disk both have different shapes on the A side from on the B side. Due to such differences, erroneous insertion of the cartridge 74 into the cartridge adaptor 90 is prevented, and further the second cartridges 71 and 74 is inserted on the correct side with respect to the cartridge adaptor 90. As a result, damage to the head and the like of the disk apparatus and malfunction of the disk apparatus can be prevented, thus realizing appropriate reproduction or recording and reproduction. Moreover, a cartridge for the two-sided disk and a cartridge for the one-sided disk can both be used in one disk apparatus, which improves the operability of the disk apparatus.

EXAMPLE 4

With reference to FIGS. 14 through 17B, a cartridge adaptor and a cartridge to be accommodated in the cartridge adaptor in a fourth example according to the present invention will be described. Elements identical with those in the first and the second examples bear identical reference numerals therewith, and explanation thereof will be omitted.

Figure 14:
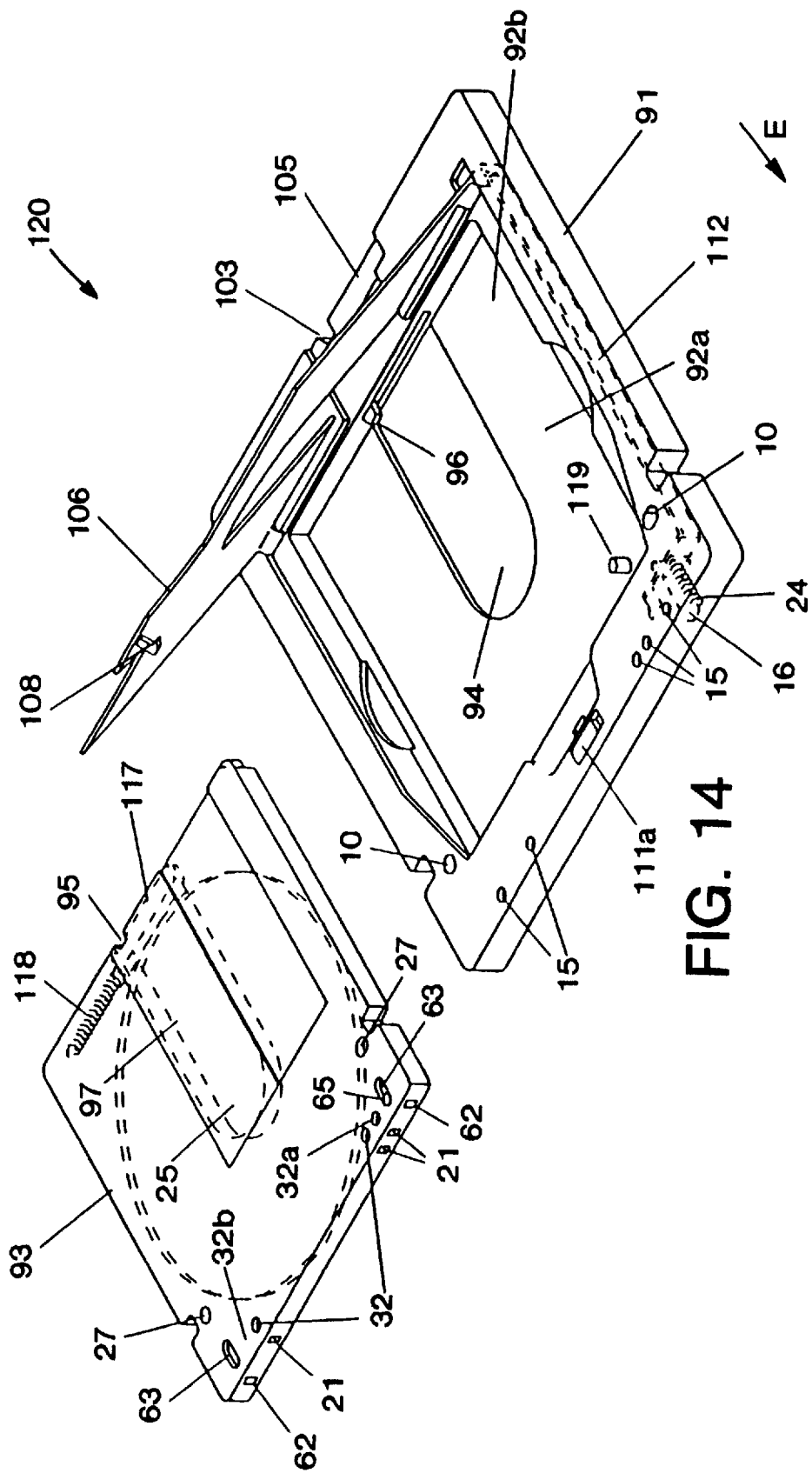
FIG. 14 is an isometric view of a cartridge adaptor and a second cartridge to be accommodated in the cartridge adaptor in a fourth example according to the present invention.
Figure 15:
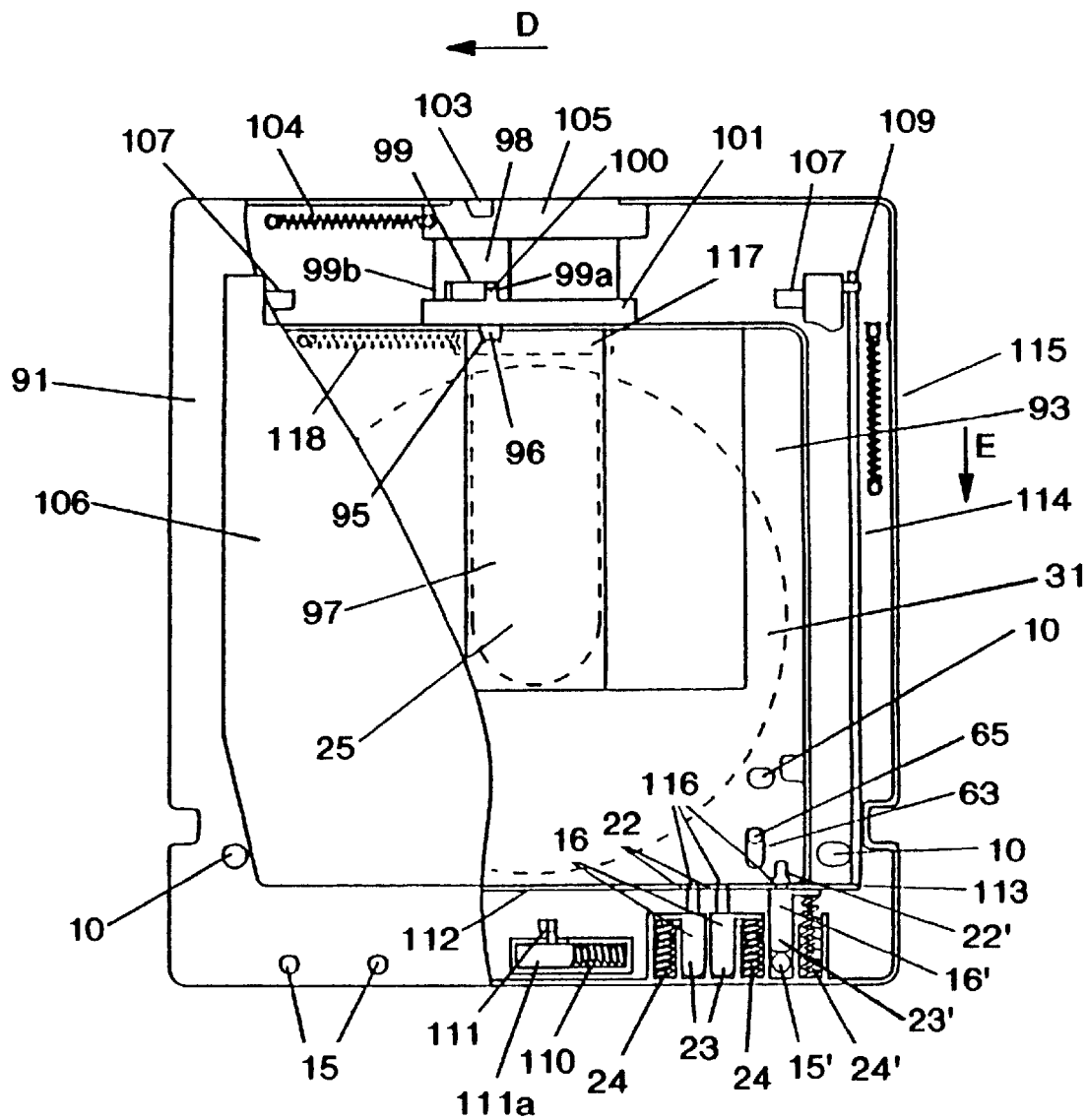
FIG. 15 is a partially cut top view of the cartridge adaptor in the state of accommodating the second cartridge shown in FIG. 14.
Figure 16A:
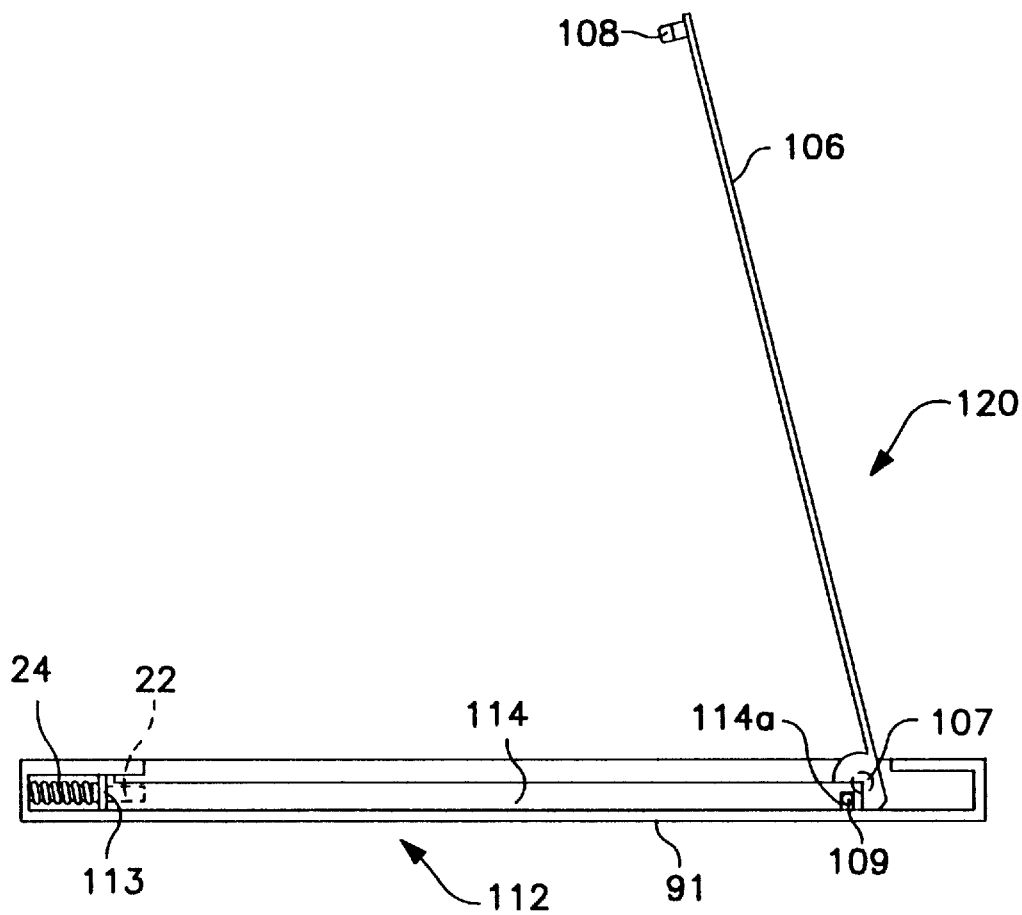
FIGS. 16A and 16B are side views of the cartridge adaptor shown in FIG. 14.
Figure 16B:
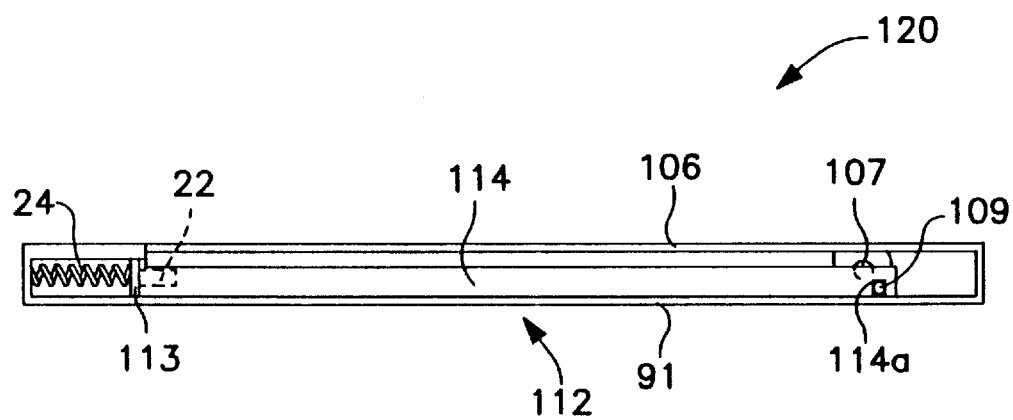

FIG. 14 is an isometric view of a cartridge adaptor 120 and a second cartridge 93 to be accommodated in the cartridge adaptor 120. FIG. 15 is a partially cut top view of the cartridge adaptor 120 in the state of accommodating the second cartridge 93. Figures 16A and 16B are side views of the cartridge 93 accommodated in the cartridge adaptor 120.

First, a cartridge adaptor in the fourth example will be described.

The cartridge adaptor 120 has the same external profile as the external profile of a first cartridge (not shown) so as to be mountable in a disk apparatus designed to receive the first cartridge, which is larger than the second cartridge 93. As is shown in FIG. 14, the cartridge adaptor 120 includes a housing 91 having a receptacle portion 92. The receptacle portion 92 has an insertion opening 92a at a top face for easily inserting the second cartridge 93 and a recess 92b for accommodating the second cartridge 93. The receptacle portion 92 also has an opening 94 at a top of the recess 92b. The opening 94 has the same profile as the profile of the first cartridge, and a disk driving mechanism and the like of a driving device of the disk apparatus can be inserted through the opening 94.

As is shown in FIG. 15, the receptacle portion 92 includes a shutter opener 101 (second opener) and an opener 105 (first opener) at a leading part thereof. The shutter opener 101 and the opener 105 act together as shutter opening means. The shutter opener 101 includes a projection 96 projecting into the recess 92b and a movable section 100. The projection 96 engages a shutter recess 95 of the second cartridge 93 when the second cartridge 93 is accommodated in the cartridge adaptor 120. The opener 105 includes a driving section 98 and an opener recess 103. The driving section 98 has a recess 99, the length of which is substantially the same as the sum of the difference between the distance of movement of a shutter of the first cartridge and a distance of movement of the shutter 97 of the second cartridge 93 and the width of the movable section 100. The opener recess 103 is located at a corresponding position to a shutter recess of the first cartridge. The opener 105 is biased in the direction of arrow D by a spring 104. When the shutter 97 of the second cartridge 93 is closed, the movable section 100 contacts an end 99a of the recess 99 of the driving section 98. Thus, the shutter opener 101 is secured at the position shown in FIG. 15.

The housing 91 further includes a lid 106 for opening and closing the insertion opening 92a. The lid 106 is pivotable about a support 107, and includes a locking section 108 (FIG. 14) and a driving section 109. In a rear part of the receptacle portion 92, a locking member 111 having a slidable section 111a is provided. When the lid 106 is closed, the locking section 108 engages the locking member 111 through the slidable section 111a which is biased by a spring 110 in the direction of engaging the locking section 108. In this manner, the lid 106 is secured.

In a side part of the receptacle portion 92, a conveying member presser 112 for conveying the opening and closing movement of the lid 106 to the conveying members 16 and 16' is slidably provided and is biased in the direction of arrow E. As is best shown in FIGS. 16A and 16B, the conveying member presser 112 includes a pressing section 113 for moving the conveying members 16 and 16' toward and away from the recess 92b in accordance with the opening and closing movement of the lid 106 and a supporting section 114. The supporting section 114 has a recessed end 114a, which is engageable with the driving section 109 of the lid 106. As is best shown in FIG. 15, the pressing section 113 has holes 116 through which the insertion sections 22 and 22' can be inserted. The receptacle portion 92 includes a projection 119 (FIG. 14) engageable with one of the identification holes 32 of the second cartridge 93 described later.

As is illustrated in FIG. 14, the second cartridge 93 includes a slider 117 at a leading part thereof. The slider 117 is connected to the shutter 97 at an end through a screw and engages a spring 118 at the other end. The slider 117 has the shutter recess 95 engageable with a shutter opening arm (not shown).

In a rear part of the second cartridge 93, identification holes 32 are formed. In this example, the identification hole 32a is open and an identification hole 32b is closed on the A side. The identification hole 32 is open on the B side. The disk apparatus recognizes which is the A side and which is the B side by such a state of identification holes 32. Except for the above-described points, the second cartridge 93 has substantially the same structure as the second cartridge 3 in the first example.

With reference to FIGS. 16A, 16B, 17A, and 17B, operation of the second cartridge 93 and the cartridge adaptor 120 will be described.

Figure 17A:
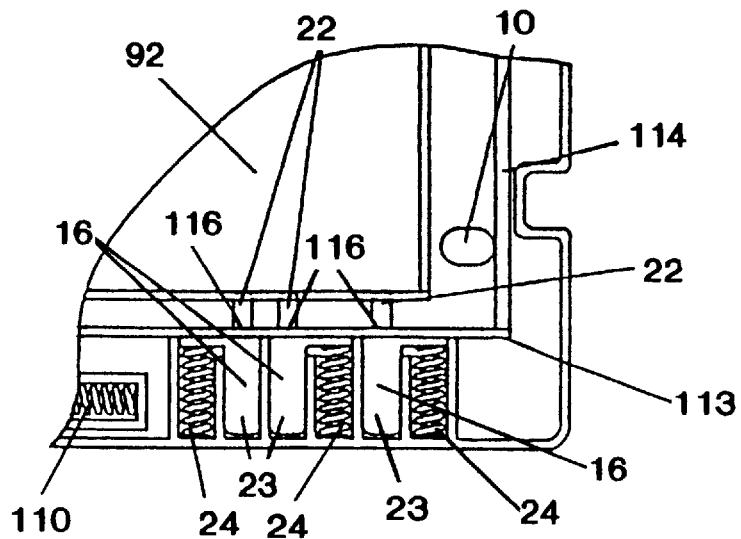
FIGS. 17A and 17B are partial top views of the cartridge adaptor in the state of accommodating the second cartridge shown in FIG. 14.
Figure 17B:
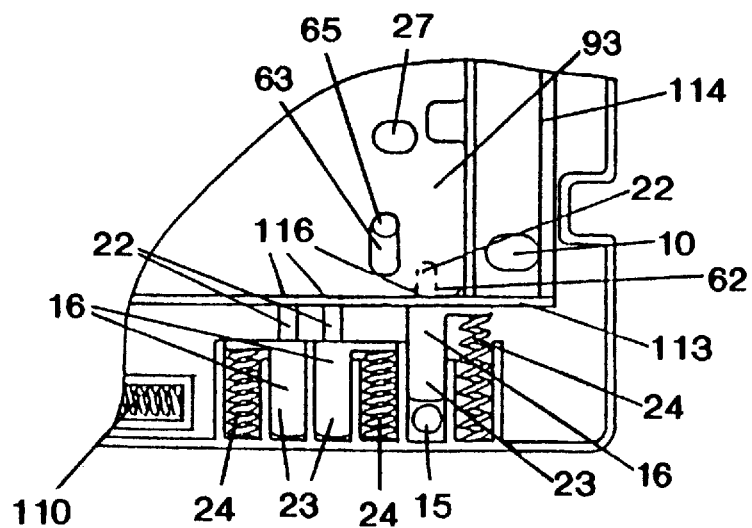

FIGS. 17A and 17B are partial top views of the cartridge adaptor 120 in the state of accommodating the second cartridge 93.

When the locking member 111 in the cartridge adaptor 120 is slid by the slidable section 111a against the force of the spring 110, the locking section 108 of the lid 106 is released from the locking member 111, thereby moving to the position shown in FIG. 16A by the biasing force of a spring 115 engaged with the supporting section 114. In this way, the recess 92b is exposed. By movement of the supporting section 114 engaged with the lid 106, the pressing section 113 moves to the position shown in FIGS. 16A and 17A, thereby pressing the conveying members 16 and 16' away from the recess 92b and thus releasing the insertion sections 22 and 22' from the recess 92b. When the second cartridge 93 is inserted into the cartridge adaptor 120 with the A side of the second cartridge 93 at the top, the projection 119 (FIG. 14) in the receptacle portion 92 is inserted into the identification hole 32a. Also, the projection 96 of the shutter opener 101 engages the shutter recess 95 of the second cartridge 93. In this manner, the second cartridge 93 is accommodated in the cartridge adaptor 120. When the lid 106 is closed against the biasing force of the spring 115, the pressing section 113 moves to the position shown in FIGS. 16B and 17B, thereby inserting the insertion sections 22 and 22' of the conveying members 16 and 16' into the transmission apertures 21 and 21'.

Operation of the conveying members 16 and 16' are performed in the same manner as described in the first and the second examples.

When the cartridge adaptor 120 is inserted into the disk apparatus, a tip of the shutter opener (not shown) engages the opener recess 103, thereby moving the opener 105 in the opposite direction to the arrow D. After the opener 105 moves by the distance corresponding to the difference between the distance of movement of the shutter of the first cartridge and the distance of movement of the shutter 97 of the second cartridge 93, an end 99b of the driving section 98 contacts the movable section 100, thereby moving the shutter opener 101. Then, the shutter 97 of the second cartridge 93 is opened.

In the case when the second cartridge 93 is inserted into the cartridge adaptor 120 with the B side of the second cartridge 93 being at the top, the projection 119 contacts the top surface of the second cartridge 93 where no identification hole is formed. Accordingly, the second cartridge 93 cannot be mounted.

In the fourth example, the shutter opening means includes the opener 105 which is movable by the distance of movement of the shutter of the first cartridge and the shutter opener 101 which is movable by the distance of movement of the shutter 97 of the second cartridge 93. Due to such a structure, after the opener 105 moves by the difference between the distance of movement of the shutter of the first cartridge and the distance of movement of the shutter 97 of the second cartridge 93, the shutter opener 105 contacts the opener 101. Accordingly, even if a second cartridge which has no shutter opener or claw as is mentioned in the first example is used, or even if the distance of movement of the shutter of the second cartridge is different from the distance of movement of the shutter of the first cartridge, the shutter of the second cartridge can be opened and closed by the shutter opening and closing mechanism of the disk apparatus. Thus, such a shutter opening and closing system can be widely used.

The identification hole 32 also acts as a recess for restricting the insertion direction of the second cartridge 93 by the engagement thereof with the projection 119. Accordingly, the insertion direction of the second cartridge 93 can be performed with a simpler structure than in the first example.

The insertion opening 92a is large, and the recess 92b is shallow. Such a profile improves production precision. Since all the side surfaces of the cartridge adaptor 120 have substantially the same thickness of that of the first cartridge, the cartridge adaptor 120 is highly strong. The insertion sections 22 and 22' can be released from the recess 92b in association with the opening of the lid 106 to mount or dismount the second cartridge 93. No extra operation is necessary to release the insertion sections 22 and 22' from the recess 92b.

In the case where a second cartridge for a one-sided disk having the positioning holes 27 only on the A side is used, projections engageable with the positioning holes 27 may be provided in the recess 92b instead of the projection 119. The insertion direction of the second cartridge can properly be restricted with such an alternative structure.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A cartridge adaptor for allowing a disk apparatus designed to receive a first cartridge accommodating a first disk and provided with a shutter opening and closing mechanism for opening and closing a shutter of the first cartridge, to perform at least one of data reproduction and data recording form and in a second disk accommodated in a second cartridge, the second cartridge being smaller in external profile than the first cartridge and wherein the second cartridge is provided with shutter means for exposing an opening in the second cartridge for insertion therethrough of at least a head for at least one of reproducing and recording and a disk driving mechanism of the disk apparatus, the cartridge adaptor comprising:

a housing for accommodating the second cartridge, the housing having an opening for insertion therethrough of at least the head and the disk driving mechanism;

shutter opening means movable in the housing and having a first engaging section engageable with the shutter opening and closing mechanism of the disk apparatus and a second engaging section engageable with the shutter means of the second cartridge; and biasing means for biasing the shutter opening means in the direction of closing the shutter means, wherein the housing has an external profile substantially identical with the profile of the first cartridge so as to be received by the disk apparatus, and wherein, when the second cartridge is mounted in the cartridge adaptor, the position and height of the second disk relative to the cartridge adaptor substantially correspond to the position and height of the first disk relative to the first cartridge and wherein when the cartridge adaptor is inserted into the disk apparatus, the first engaging section engages the shutter opening and closing mechanism of the disk apparatus and causes the shutter opening means to move through a first distance, after which the second engaging section engages the shutter means and moves through a second distance to move the shutter means, the second distance being less than the distance of movement of the shutter of the first cartridge when the first cartridge is inserted into the disk apparatus.

2. A cartridge adaptor according to claim 1, wherein:

the shutter opening means includes a first opener which includes the first engaging section and is movable by the distance of movement of the shutter of the first cartridge; and a second opener which has the second engaging section and a contact section contactable with the first opener and movable by the distance of movement of the shutter means of the second cartridge when the cartridge adaptor with the second cartridge is inserted into the disk apparatus; and when the cartridge adaptor is inserted into the disk apparatus, the first opener moves by the difference between the distance of movement of the shutter of the first cartridge and the distance of movement of the shutter means of the second cartridge and then the contact section of the second opener contacts the first opener.

\* \* \* \* \*